US012354629B2

(12) United States Patent
Le et al.

(10) Patent No.: US 12,354,629 B2
(45) Date of Patent: *Jul. 8, 2025

(54) SOT READER WITH RECESSED SOT TOPOLOGICAL INSULATOR MATERIAL

(71) Applicant: Western Digital Technologies, Inc., San Jose, CA (US)

(72) Inventors: Quang Le, San Jose, CA (US); Rohan Babu Nagabhirava, Virginia Beach, VA (US); Xiaoyong Liu, San Jose, CA (US); Brian R. York, San Jose, CA (US); Cherngye Hwang, San Jose, CA (US); Son T. Le, San Jose, CA (US); Randy G. Simmons, San Jose, CA (US); Kuok San Ho, Emerald Hills, CA (US); Hisashi Takano, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/228,529

(22) Filed: Jul. 31, 2023

(65) Prior Publication Data
US 2024/0144965 A1 May 2, 2024

Related U.S. Application Data

(60) Provisional application No. 63/420,845, filed on Oct. 31, 2022.

(51) Int. Cl.
G11B 5/31 (2006.01)
G11B 5/11 (2006.01)
G11B 5/39 (2006.01)

(52) U.S. Cl.
CPC ............... *G11B 5/39* (2013.01); *G11B 5/11* (2013.01); *G11B 2005/3996* (2013.01)

(58) Field of Classification Search
CPC .... G11B 2005/0024; G11B 2005/3996; G11B 5/11; G11B 5/3133; G11B 5/39; G11B 5/3909; G11B 5/31
See application file for complete search history.

(56) References Cited

U.S. PATENT DOCUMENTS

| 9,947,347 B1 | 4/2018 | Van Der Heijden et al. |
| 10,181,334 B1 | 1/2019 | Song et al. |
| 10,580,441 B1 | 3/2020 | Chen et al. |
| 10,720,570 B2 | 7/2020 | Le et al. |
| 11,094,338 B1 | 8/2021 | Hwang et al. |

(Continued)

*Primary Examiner* — Holly Rickman
*Assistant Examiner* — Linda N Chau
(74) *Attorney, Agent, or Firm* — Patterson + Sheridan, LLP

(57) ABSTRACT

The present disclosure generally relates to spin-orbit torque (SOT) devices comprising a bismuth antimony (BiSb) layer. The SOT devices further comprises a first shield, a BiSb layer disposed over the first shield (S1), a free layer (FL) disposed over the BiSb layer, and a second shield (S2) disposed over the FL. The S1, the FL, and the S2 are disposed at a media facing surface (MFS). The BiSb layer is recessed from the MFS a first distance of about 5 nm to about 20 nm. The FL has a length greater than the first distance. A notch and/or an insulation layer is disposed adjacent to the BiSb layer at the MFS. Current may be configured to flow vertically through the S2 to the FL, and horizontally from the FL to the BiSb layer. Current may be configured to flow vertically through the S2 to the S1.

25 Claims, 12 Drawing Sheets

(56) References Cited

U.S. PATENT DOCUMENTS

| | | | |
|---|---|---|---|
| 11,100,946 | B1 | 8/2021 | Le et al. |
| 11,205,447 | B2 | 12/2021 | Chen et al. |
| 11,222,656 | B1 | 1/2022 | Le et al. |
| 11,282,538 | B1 | 3/2022 | Kief |
| 11,489,108 | B2 | 11/2022 | Le et al. |
| 2012/0206830 | A1 | 8/2012 | Gao et al. |
| 2014/0226239 | A1 | 8/2014 | Mihajlovic et al. |
| 2018/0358543 | A1 | 12/2018 | Le et al. |
| 2020/0212104 | A1 | 7/2020 | Sonobe |
| 2022/0005498 | A1 | 1/2022 | Le et al. |
| 2022/0013138 | A1 | 1/2022 | Hwang et al. |
| 2023/0306993 | A1 | 9/2023 | Le et al. |

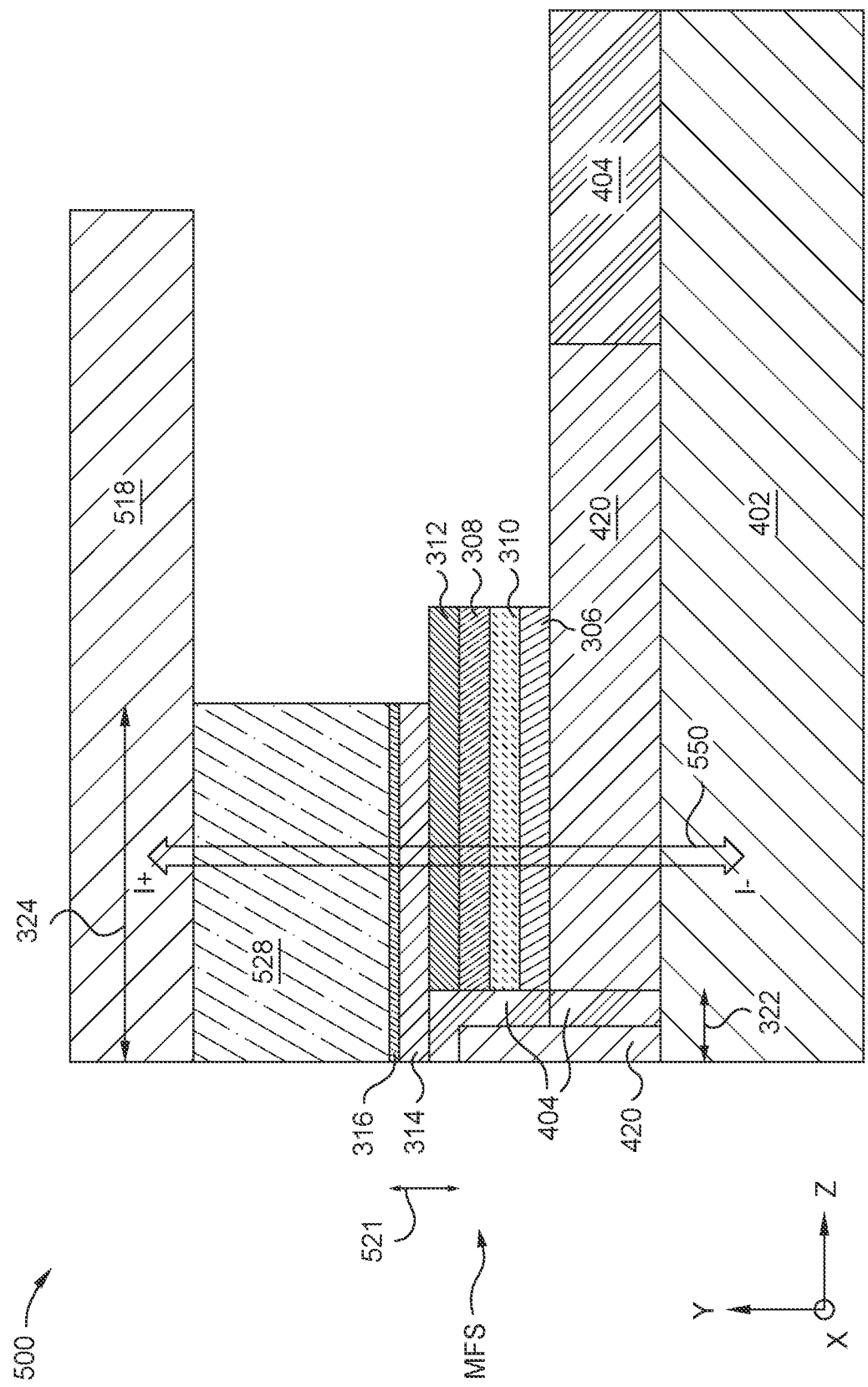

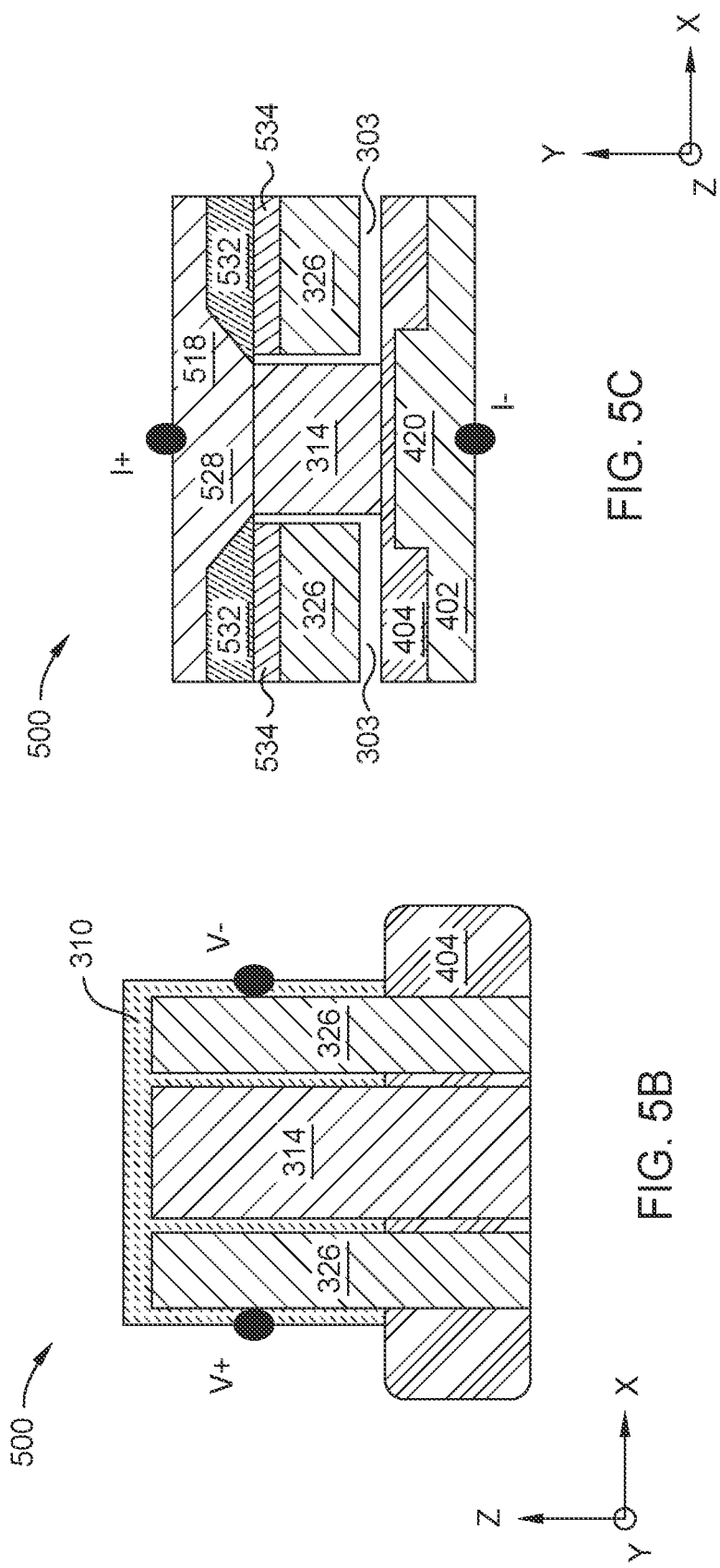

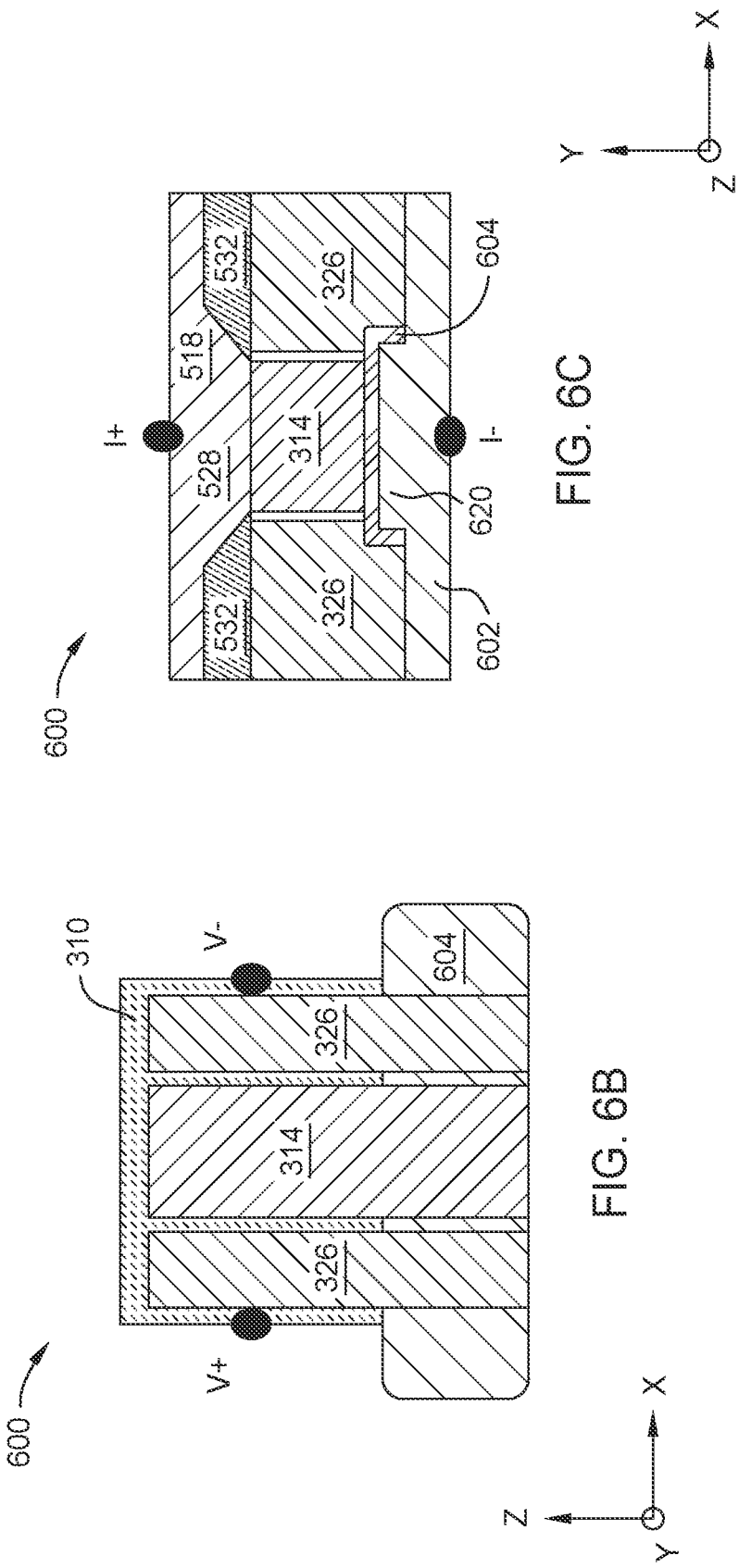

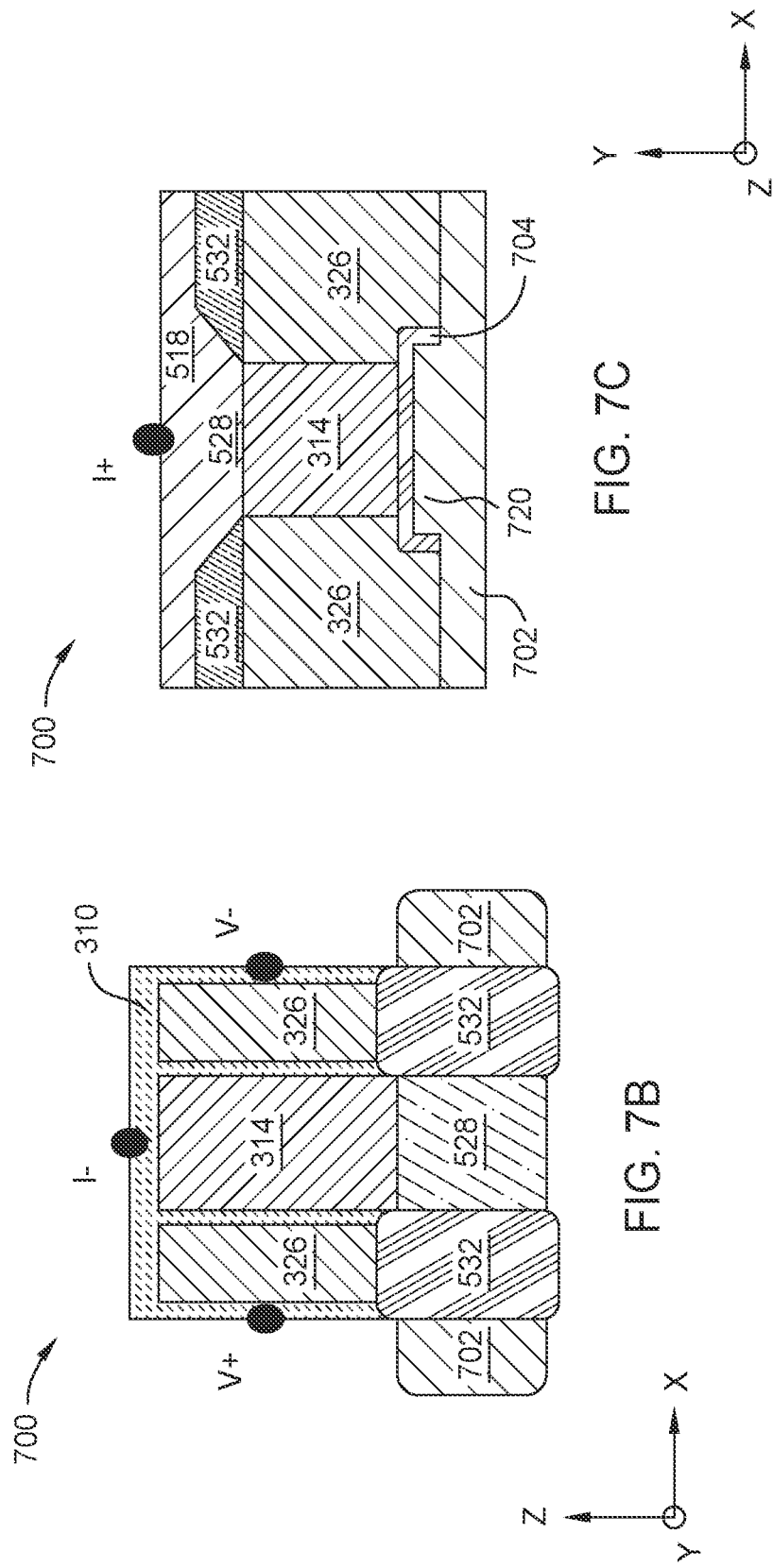

SOT READER WITH RECESSED SOT TOPOLOGICAL INSULATOR MATERIAL

CROSS-REFERENCE TO RELATED APPLICATIONS

This application claims benefit of U.S. provisional patent application Ser. No. 63/420,845, filed Oct. 31, 2022, which is herein incorporated by reference.

BACKGROUND OF THE DISCLOSURE

Field of the Disclosure

Embodiments of the present disclosure generally relate to spin-orbit torque (SOT) device comprising a bismuth antimony (BiSb) layer.

Description of the Related Art

BiSb layers are narrow band gap topological insulators with both giant spin Hall effect and high electrical conductivity. BiSb is a material that has been proposed in various spin-orbit torque (SOT) device applications, such as for a spin Hall layer for magnetoresistive random access memory (MRAM) devices and energy-assisted magnetic recording (EAMR) write heads.

However, utilizing BiSb materials in commercial SOT applications can present several obstacles. For example, BiSb materials have low melting points, large grain sizes, significant Sb migration issues upon thermal annealing due to its film roughness, difficulty maintaining a desired (012) or (001) orientation for maximum spin Hall effect, and are generally soft and easily damaged by ion milling.

Therefore, there is a need for an improved SOT device design utilizing BiSb layer(s) having a desired crystal orientation and a high signal-to-noise ratio.

SUMMARY OF THE DISCLOSURE

The present disclosure generally relates to spin-orbit torque (SOT) devices comprising a bismuth antimony (BiSb) layer. The SOT devices further comprises a first shield, a BiSb layer disposed over the first shield, a free layer (FL) disposed over the BiSb layer, and a second shield disposed over the FL. The first shield, the FL, and the second shield are disposed at a media facing surface (MFS). The BiSb layer is recessed from the MFS a first distance of about 5 nm to about 20 nm. The FL has a length greater than the first distance. A notch and/or an insulation layer is disposed adjacent to the BiSb layer at the MFS. In one embodiment, current is configured to flow vertically through the second shield to the free layer, and horizontally from the FL to the BiSb layer. In another embodiment, current is configured to flow vertically through the second shield to the first shield.

In one embodiment, a magnetic recording head comprises a first shield extending to a media facing surface (MFS), a bismuth antimony (BiSb) layer disposed over the first shield, the BiSb layer being recessed from the MFS, a free layer disposed over the BiSb layer, the free layer extending to the MFS, and a second shield disposed over the free layer, the second shield extending to the MFS.

In another embodiment, a magnetic recording head comprises a first shield extending to a media facing surface (MFS), a first notch disposed on the first shield, the first notch having a first portion disposed at the MFS, a buffer layer disposed on the first notch, the buffer layer being recessed from the MFS, a bismuth antimony (BiSb) layer disposed on the buffer layer, the BiSb layer being recessed from the MFS, a free layer disposed over the BiSb layer, the free layer extending to the MFS, and a second shield disposed over the free layer, the second shield extending to the MFS.

In another embodiment, a magnetic recording head comprises a first shield extending to a media facing surface (MFS), a buffer layer disposed on the first shield, a bismuth antimony (BiSb) layer disposed on the buffer layer, the BiSb layer being recessed from the MFS a first distance of about 5 nm to about 20 nm, an interlayer disposed on the BiSb layer, a free layer disposed over the interlayer, the free layer extending to the MFS, wherein the free layer has a first length extending from the MFS greater than the first distance, a cap layer disposed over the free layer, and a second shield disposed over the cap layer, the second shield extending to the MFS.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5C illustrate various views of a SOT device, according to yet another embodiment.

FIGS. 6A-6C illustrate various views of a SOT device, according to another embodiment.

FIGS. 7A-7C illustrate various views of a SOT device, according to yet another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to spin-orbit torque (SOT) devices comprising a bismuth antimony (BiSb) layer. The SOT devices further comprises a first shield, a BiSb layer disposed over the first shield, a free layer (FL) disposed over the BiSb layer, and a second shield disposed over the FL. The first shield, the FL, and the second shield are disposed at a media facing surface (MFS). The BiSb layer is recessed from the MFS a first distance of about 5 nm to about 20 nm. The FL has a length greater than the first distance. A notch and/or an insulation layer is disposed adjacent to the BiSb layer at the MFS. In one embodiment, current is configured to flow vertically through the second shield to the free layer, and horizontally from the FL to the BiSb layer. In another embodiment, current is configured to flow vertically through the second shield to the first shield.

A BiSb layer having a (012) orientation or a (001) orientation has a significant spin Hall angle and high electrical conductivity. Therefore, a BiSb layer having a (012) orientation or a (001) orientation can form a SOT device. For example, a BiSb layer having a (012) orientation or a (001) orientation can be used as a spin Hall layer in a spin-orbit torque device in a magnetic recording head, e.g., as part of a write head (MAMR). In another example, a BiSb layer having a (012) orientation or a (001) orientation can be used in nano oscillator devices for reading head applications where a signal is detected in the frequency domain. In another example, a BiSb layer having a (012) orientation or a (001) orientation can be used as a spin Hall electrode layer in an MRAM device. The SOT device can be in a perpendicular stack configuration or an in-plane stack configuration. The SOT device can be utilized in, for example, MAMR writing heads, read head, nano-oscillator based reader, MRAM, artificial intelligence chips, and other applications.

Figure 1:
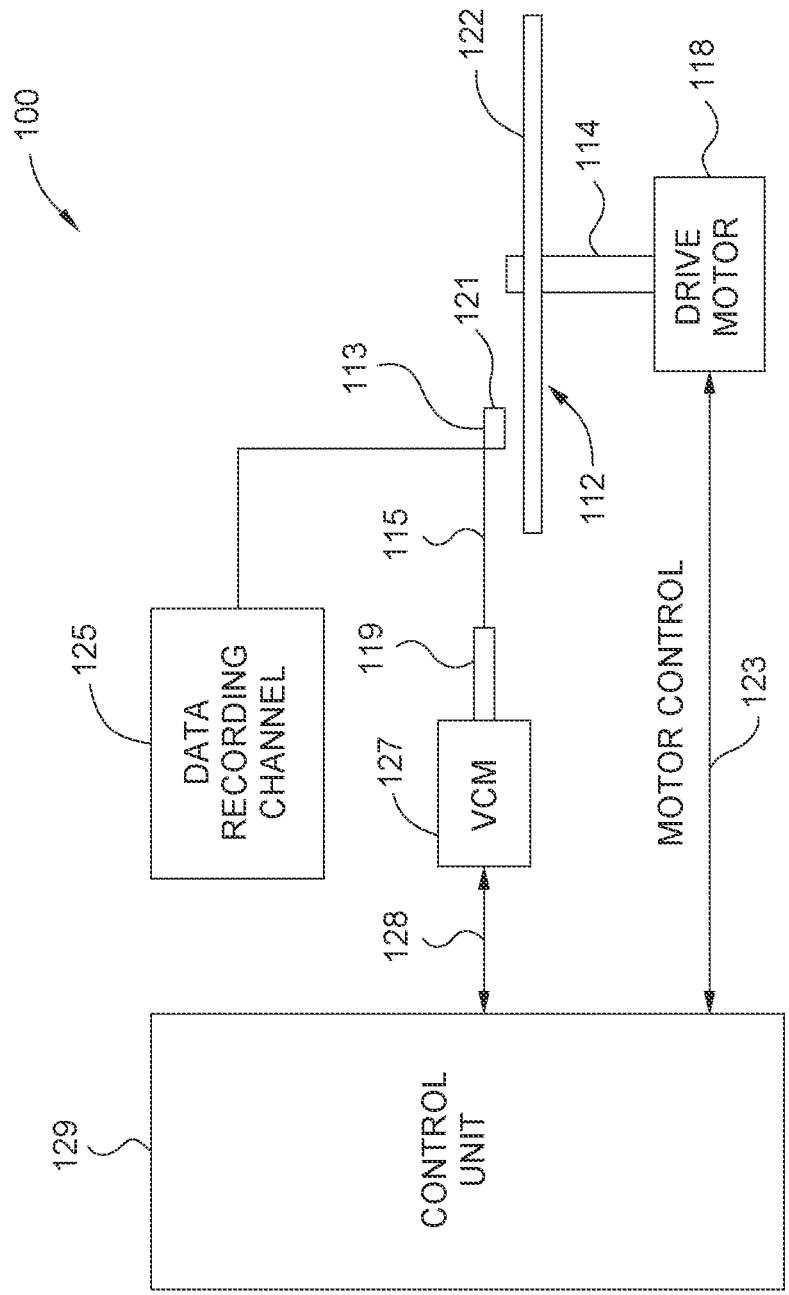
FIG. 1 is a schematic illustration of certain embodiments of a magnetic media drive including a magnetic recording head having a SOT device.

FIG. 1 is a schematic illustration of certain embodiments of a magnetic media drive 100 including a magnetic recording head having a SOT device. Such a magnetic media drive may be a single drive or comprise multiple drives. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

Figure 2:
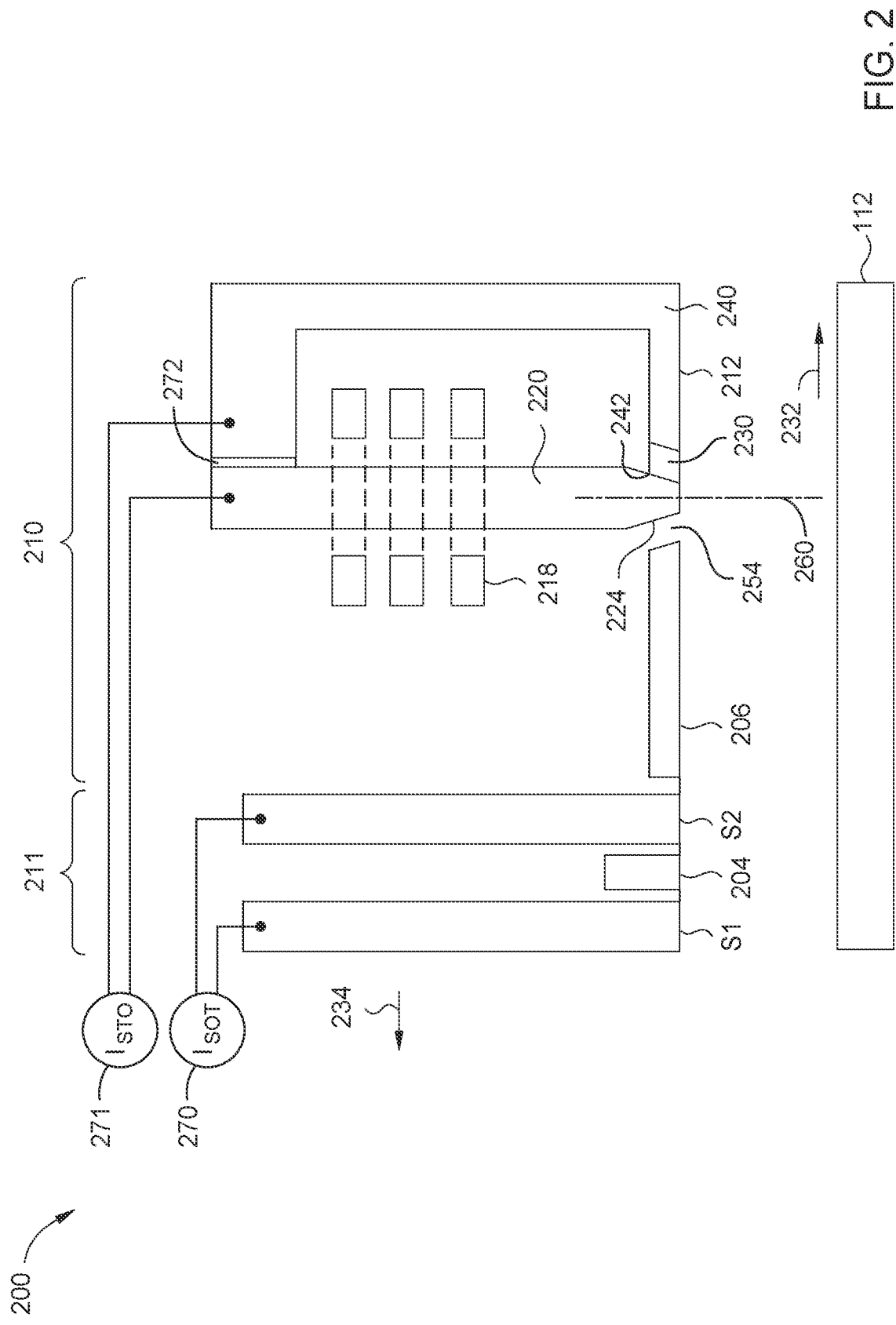
FIG. 2 is a fragmented, cross-sectional side view of certain embodiments of a read/write head having a SOT device.

At least one slider 113 is positioned near the magnetic disk 112, each slider 113 supporting one or more magnetic head assemblies 121 that include a SOT device. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 2 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders. It is to be understood that the embodiments discussed herein are applicable to a data storage device such as a hard disk drive (HDD) as well as a tape drive, such as those conforming to the LTO (Linear Tape Open) standards. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

FIG. 2 is a fragmented, cross-sectional side view of certain embodiments of a read/write head 200 having a SOT device. It is noted while an SOT device is shown in both the read head and write head, this is for illustrative purposes only, and an SOT device may be independently integrated into either only the read head or only the write head in various embodiments, or in both the read head and the write head. The read/write head 200 faces a magnetic media 112. The read/write head 200 may correspond to the magnetic head assembly 121 described in FIG. 1. The read/write head 200 includes a media facing surface (MFS) 212, such as a gas bearing surface, facing the disk 112, a write head 210, and a magnetic read head 211. As shown in FIG. 2, the magnetic media 112 moves past the write head 210 in the direction indicated by the arrow 232 and the read/write head 200 moves in the direction indicated by the arrow 234.

In some embodiments, the magnetic read head 211 is a SOT read head that includes an SOT sensing element 204 located between reader shields S1 and S2, where a first current source 270 is coupled to S1 and S2 via one or more lead connections to provide a current to the SOT sensing element 204. In some embodiments, a lead connection may be coupled to a shield within the SOT sensing device. Voltage detection leads (not shown) are within the SOT sensing element 204. The magnetic fields of the adjacent magnetized regions in the magnetic disk 112 are detectable by the SOT sensing element 204 as the recorded bits. In SOT sensing elements 204 comprising a BiSb layer, such as the SOT devices described in FIGS. 4A-4C, current flows perpendicular to the film plane, and the signal is read out by measuring the voltage in the BiSb layer generated by the inverse spin Hall effect. The SOT device of various embodiments can be incorporated into the read head 211.

The write head 210 includes a main pole 220, a leading shield 206, a trailing shield 240, and a coil 218 that excites the main pole 220, where a second current source 271 is coupled to the main pole 220 and the trailing shield 240. The coil 218 may have a "pancake" structure which winds around a back-contact between the main pole 220 and the trailing shield 240, instead of a "helical" structure shown in FIG. 2. In one embodiment, the write head 210 is a perpendicular magnetic recording (PMR) write head. In other embodiments, the write head 210 may use energy assisted magnetic recording (EAMR) technologies such as microwave assisted magnetic recording (MAMR) and heat assisted magnetic recording (HAMR).

In FIG. 2, optionally a spin orbital torque (SOT) device 230 is shown as part of the write head structure to enable a MAMR recording effect, in one embodiment. As noted above, while an SOT device is shown in FIG. 2 for both the read head and the write head, the SOT devices are not required to be implemented in both. For example, the write head may instead include other components to support HAMR in which case SOT device 230 may be absent. The SOT device 230 is formed in a gap 254 between the main pole 220 and the trailing shield 240. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy. In certain embodiments, the trailing shield 240 can include a trailing shield hot seed layer (not shown). The trailing shield hot seed layer can include a high moment sputter material, such as CoFe, CoFeNi, CoFeX, FeX, or FeXN, where X includes at least one of Rh, Al, Ta, Zr, Co, Fe, N, and Ti. In certain embodiments, the trailing shield 240 does not include a trailing shield hot seed layer.

In some embodiments, the read head 211 is a spin torque oscillator (STO) read head with an STO oscillator sensing element 204 located between shields S1 and S2. The magnetic fields of the adjacent magnetized regions in the magnetic disk 112 are detectable by the STO sensing element 204 as the recorded bits. The STO sensing elements 204 comprise a BiSb layer, such as an SOT device of FIGS. 3A-7C. The STO reader may be operated in a 4-terminal or a 3-terminal configuration, with an out-of-plane current flowing inside the SOT structure while a sensing voltage is read out in the film plane. The SOT device of various embodiments can be incorporated into the read head 211.

FIGS. 3A-7C illustrate various views of spin-orbit torque (SOT) devices 300, 400, 500, 600, 700, according to various embodiments. Each SOT device 300, 400, 500, 600, 700 may individually be used in the magnetic recording head of the drive 100 of FIG. 1 or other suitable magnetic media drives, such as the read head 211 and/or write head 210 of FIG. 2. Aspects of the SOT devices 300, 400, 500, 600, 700 may be used in combination with one another.

Furthermore, while the SOT devices 300, 400, 500, 600, 700 are referred to as SOT devices, the SOT devices 300, 400, 500, 600, 700 may function as spin torque oscillator (STO) devices. In some embodiments, when the SOT devices 300, 400, 500, 600, 700 are used in a write head, the current flows in-plane to the SOT layer or bismuth antimony (BiSb) layer 310, and the ferromagnetic (FM) or free layer is oscillated by the SOT generated by the spin Hall effect in the BiSb layer 310.

Figure 3A:
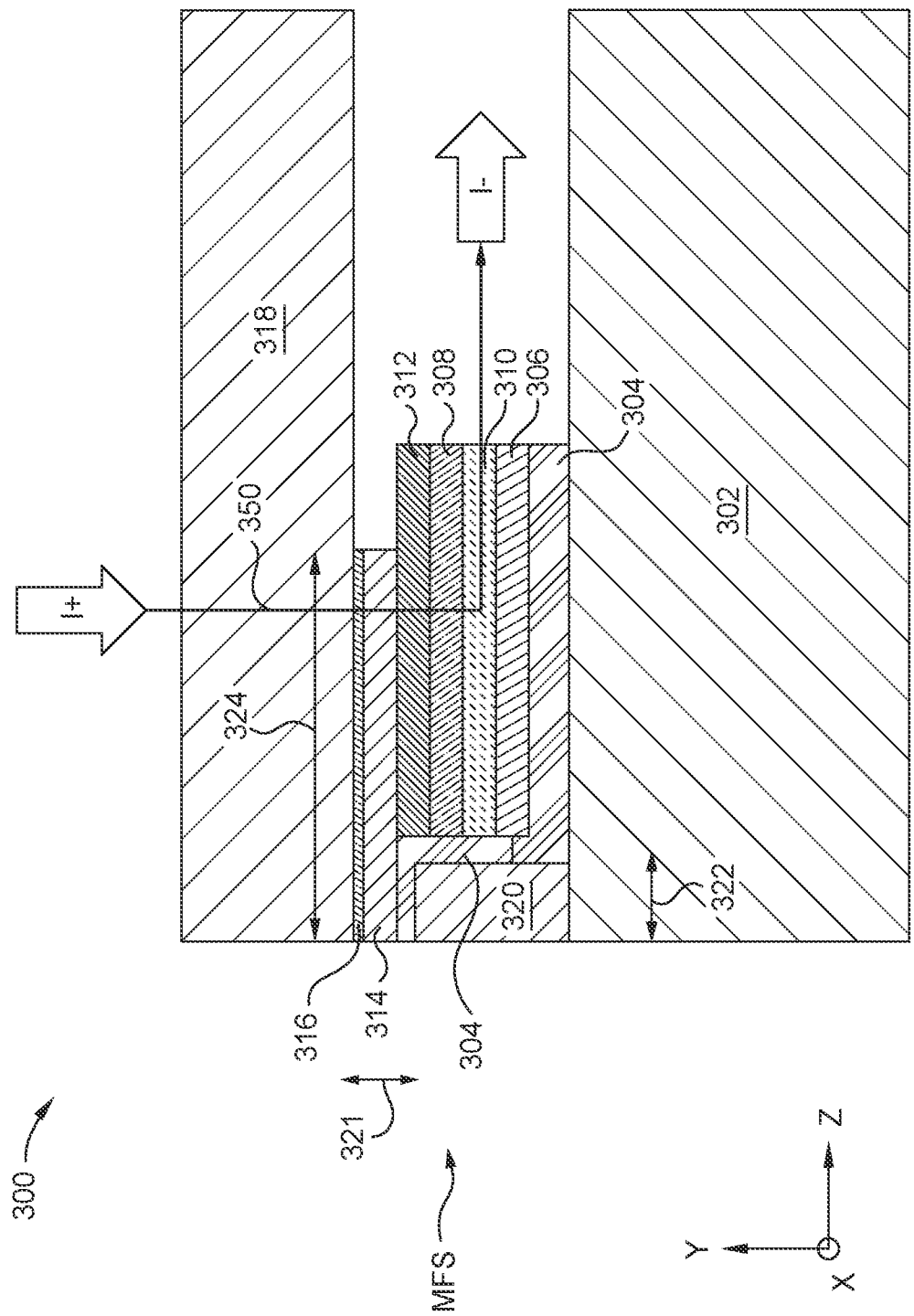
FIGS. 3A-3C illustrate various views of a SOT device, according to one embodiment.
Figure 3C:
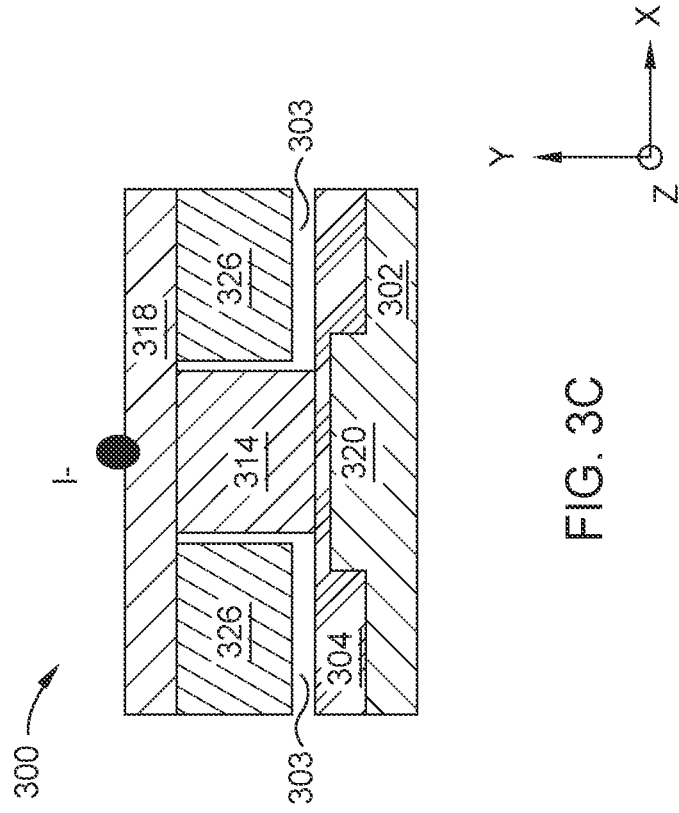
Figure 3B:
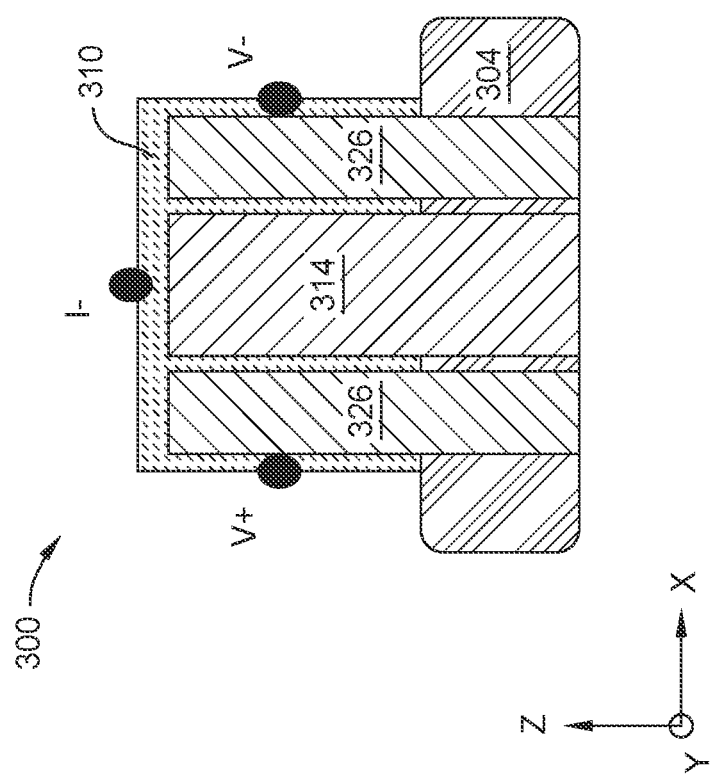

FIGS. 3A-3C illustrate various views of a SOT device 300, according to one embodiment. FIG. 3A illustrates a cross-sectional or APEX view of the SOT device 300, FIG. 3B illustrates a downtrack cross-sectional view of the SOT device 300, and FIG. 3C illustrates a media facing surface (MFS) view of the SOT device 300. The downtrack cross-sectional view of FIG. 3B illustrates the top of the free layer 314, but does not show the second shield 318.

The SOT device 300 comprises a first shield (S1) 302, an insulation layer 304 disposed on the first shield 302, a buffer layer 306 disposed on the insulation layer 304, a spin Hall effect (SHE) layer or BiSb layer 310 disposed on the buffer layer 306, an interlayer 308 disposed on the SHE layer 310, a ferromagnetic (FM) layer 312 disposed on the interlayer 308, a free layer 314 disposed on the FM layer 312, a cap layer 316 disposed on the free layer 314, and a second shield (S2) 318 disposed on the cap layer 316. The FM layer 312 is optional, and may be a part of the free layer 314. The first shield 302 further comprises a S1 notch 320 disposed at the MFS. The insulation layer 304 is disposed on the S1 notch 320 at the MFS, and is further disposed behind the S1 notch 320 recessed from the MFS, such that the insulation layer 304 has a Z-like shape. The S1 notch 320 has a thickness in the y-direction of about 1 nm to about 5 nm. The SOT device 300 may comprise additional layers not shown, such as a seed layer and/or a barrier layer.

In the SOT device 300, the buffer layer 306, the SHE layer 310, the interlayer 308, and the FM layer 312 are recessed from the MFS by a portion of the insulation layer 304 and the S1 notch 320. The free layer 314 and the cap layer 316 are disposed at the MFS. The buffer layer 306, the SHE layer 310, the interlayer 308, and the FM layer 312 are recessed from the MFS a distance 322 in the z-direction of about 5 nm to about 20 nm. The free layer 314 and the cap layer 316 each individually has a stripe height 324 in the z-direction of about 10 nm to about 30 nm. The distance 322 the buffer layer 306, the SHE layer 310, the interlayer 308, and the FM layer 312 are recessed from the MFS is less than the stripe height 324. The buffer layer 306, the SHE layer 310, the interlayer 308, and the FM layer 312 may also have a stripe height in the z-direction of about 10 nm to about 100 nm.

Furthermore, due to the S1 notch 320, the shield-to-shield spacing of the SOT device 300 is reduced at the MFS, which narrows the read gap. The shield-to-shield spacing is the distance 321 from the second shield 318 to the S1 notch 320 at the MFS, which includes the free layer 314, the cap layer 316, and the portion of the insulation layer 304 disposed at the MFS. The distance 321 is about 5 nm to about 20 nm.

The SHE layer 310 comprises BiSb, and may be referred to as a BiSb layer 310, a SOT layer 310, and/or a topological insulator (TI) layer 310. The BiSb layer 310 may have a thickness in the y-direction of about 50 Å to about 200 Å. The BiSb layer 310 may comprise undoped BiSb or doped BiSbX, where the dopant is less than about 10%, and where X is extracted from elements which don't readily interact with either Bi or Sb, such as Cu, Ag, Ge, Mn, Ni, Co Mo, W, Sn, B, N, In, Te, Se, Y, Pt, Ti, N, or in alloy combinations with one or more of aforementioned elements, like CuAg, CuNi, CoCu, AgSn. The BiSb layer 310 may have a (012) crystal orientation or a (001) crystal orientation. The BiSb layer 310 may have a width in the z-direction that is greater than a width of the free layer 314, like shown in FIG. 3B.

The cap layer 316 may comprise nonmagnetic, high resistivity materials, such as: thin ceramic oxides or nitrides of TiN, SiN, and MgO; amorphous/nanocrystalline metals such as NiFeTa, NiTa, NiHf, NiFeHf, CoHf, CoFeHf, NiV-VTa, NiFeW, NiW, WRe, beta-Ta, and beta-W; or nitrides, oxides, or borides of above-mentioned elements, compounds, and/or alloys such as NiTaN, NiFeTaN, NiVVTaN, NiWN, WReN, TaN, WN, TaOx, WOx, WB, HfB, NiHfB, NiFeHfB, CoHfB, and CoFeHfB, where x is a numeral. In some embodiments, lower atomic number (Z) materials are preferred in the cap layer 316 to reduce sputter intermixing with the FM layer 312, but high Z alloys can be used, if used in combination with a migration barrier beneath, or if the high Z elements are used with a high resistive oxide, nitride, or boride. The cap layer 316 can comprise multilayer combinations of the above-mentioned materials, and the overall thickness of the cap layer 316 in the y-direction is less than or equal to about 100 Å (nominally about 15 Å to about 50 Å).

The FM layer 312, which serves as a part of the free layer 314, has a thickness of about 5 Å to about 15 Å in the y-direction, and may comprise NiFe, CoFe, NiFeX, CoFeX, FeX, or NiX, where X=Co, Ni, Cu, Si, Al, Mn, Ge, Ta, Hf, and B. The FM layer 312 may comprise any magnetic layer combination or alloy combination of these elements that can yield a low coercivity, negative magnetostrictive FM layer 312 or in multilayer combinations with other higher polarizing materials like Heusler alloys or high Ni containing alloy FM layers.

The free layer 314 may comprise CoFeB, Co, CoFe, NiFe, or a similar material as the FM layer 312. The insulation layer 304 comprises an insulating material like SiN, or an oxide like MgO and can be used in combination with a Heusler alloy layer, and is adjacent to the BiSb layer to maintain texture and control Bi and Sb interdiffusion. The first and second shields 302, 318 and the S1 notch 320 may individually comprise a magnetic permeable and electrically conductive material selected from the group consisting of NiFe, CoFe, NiFeCo, alloys, and their combination, NiFe, NiFeCr, or other soft magnetic materials.

Each of the buffer layer 306 and the interlayer 308 comprises magnetic or nonmagnetic Heusler alloys, where the Heusler alloys may be full Heusler alloys (i.e., $X_2YZ$) or half Heusler alloys (i.e., XYZ). Full $X_2YZ$ type Heusler alloys generally have L21, cF16, or C1b type structures with an a-axis between about 5.70 Å and about 6.20 Å, which perfectly matches to RuAl or CrMo texturing layer 452. Half XYZ type Heusler alloys generally have a B2 type or Pm-3m type structure with a-axis between about 2.85 Å to about 3.10 Å. However, the type or structure may vary with respect to both half and full Heusler alloys. For instance, RuMnAl, RhMnAl, and $Al_2CuRh$, have a Pm-3m structure, and $Ni_2MnAl$ and $Mn_2NiAl$ have cF16 structures while $Al_2NiMn$ has a B2 structure.

With both full and half Heusler alloys, X may be one of Li, Mg, Mn, Fe, Co, Ni, Cu, Ru, Rh, Pd, Ag, Cd, Ir, Pt, or Au; Y may be one of Li, Be, Sc, Ti, V, Cr, Mn, Fe, Co, Ni, Zn, Y, Zr, Nb, Mo, Hf, or W; and Z may be one of B, Mg, Al, Si, Zn, Ga, Ge, As, In, Sn, Sb, Pb, or Bi. Some nonmagnetic Heusler alloy examples include $Ti_2MnAl$, $Fe_2VAl$ (a-axis=5.78 Å), $Cr_2CoAl$ (a-axis=5.88 Å), CoTiSb (a-axis=5.88 Å), $Mn_2VSi$, $V_2VAl$ (a-axis=6.14 Å), $[Mn_{1-x}Co_x]_2VAl$ (x=0.5) (a-axis=6.05 Å), $[Mn_{1-x}Co_x]_2VSi$ (x=0.25) (a-axis=6.18 Å), and CoMnNbAl, CoZrFeAl. Magnetic Heusler alloy examples having large spin polarizations include $Co_2MnSb$ (a-axis=5.94 Å), $Co_2MnGe$ (a-axis=5.75 Å), CoMnSb (a-axis=5.90 Å) NiMnSb, $Co_2FeGe$, $Co_2MnSn$, and $Co_2MnFeGe$, each of which does not readily mix with the BiSb layer 310.

Moreover, in some embodiments, each of buffer layer 306 and the interlayer 308 comprises: (1) amorphous/nanocrystalline layers formed from Heusler alloys in combination with elements, or alloy layers that don't readily mix with the SOT or FM layers, or uniform alloys formed by co-sputtering Heusler alloys with other elements, or alloys which don't readily intermix with SOT or FM layer, or (2) polycrystalline Heusler alloys, which are epitaxial layers in the SOT device 300. With respect to amorphous/nanocrystalline buffer layers 306 and the interlayers 308, thin polycrystalline Heusler alloys (both magnetic and nonmagnetic, and full or half Heusler alloys) can be used when alloyed with other elements that don't readily mix with the BiSb layer 310, such as Cu, Ag, Ge, Mn, Ni, Co Mo, W, Sn, B, Te, Se, Y, Pt, Ti, N, and In, or in alloy combinations with one or more of aforementioned elements, such as CuAg, CuNi, CoCu, AgSn.

With respect to polycrystalline Heusler alloys, thin layers of Heusler alloys, both magnetic and nonmagnetic, full or half Heusler alloys, can be used as the buffer layer 306 and the interlayer 308 in (100) textured layer SOT devices (SOT orientation in this scenario is (012)). Heusler alloys generally have higher resistivities then the FM layer 312, and transport spin currents or yield high spin polarization, while providing and maintaining (100) growth. Heusler alloys further have excellent lattice matching capabilities to MgO tunnel barrier layers and to bcc FM alloys. (100) texturing layers, such as a texture layer, can be used to establish the (100) texture, and non-magnetic Heusler $X_2YZ$ or XYZ having cF16 (C1b, L21) or B2 structures can be used to transmit the texture to the BiSb layer 310, which in turn grows a strong (012) texture for the BiSb layer 310 with an epitaxial bcc, B2, or C1b, cF16, L21 Heusler interlayer to produce a strong epitaxial (100) texture for the bcc or B2 FM layer 312.

Other non-Heusler, nonmagnetic materials that could be used for one or more of the epitaxial buffer layer 306 and/or the interlayer 308 for epitaxial growth are: B2 or bcc materials, such as AlX, where X=V, Mn, Fe, Co, Ni, Ru, Rh, and Nobel metals Re, Os, Ir, Pt, Au, and Pd or in alloy combinations thereof; CrMo, where Mo is between about 20% to about 50%, CrMoTi, Cr, MoV, CrMoW; or CrXY, where X and Y are each individually selected from the group consisting of: Al, Ti, Mn, Co, Ni, Ru, Mo, Rh, W, and V.

In some embodiments, the buffer layer 306 and/or the interlayer 308 can each be formed from thin ceramic oxide or nitride layers like TiN, WN, SiN, and $Al_2O_3$, and MgO in combination with other high resistive nonmagnetic material layers. The top portion of a multilayer interlayer 308 (e.g., not in direct contact with the FM layer 312) may also be comprise of high resistivity heavier metal amorphous or amorphous/nanocrystalline metals like NiFeTa, NiTa, NiHf, NiFeHf, CoHf, CoFeHf, NiVVTa, NiFeW, NiW, and WRe; nanocrystalline metals like beta-Ta and beta-W; or nitrides, oxides, or borides of the aforementioned elements or alloys like NiTaN, NiFeTaN, NiWTaN, NiWN, WReN, TaN, WN, TaOx, WOx, TaBx, WBx, HfBx, NiHfB, NiFeHfB, and CoHfB, where x is a numeral.

The bottom portion of the interlayer 308 can be an amorphous/nanocrystalline material formed from Heusler alloys or other magnetic alloy materials when combined with aforementioned non-interacting elements or alloy combinations of those elements. Higher resistivity nonmagnetic alloys which do not interact with the FM layer 312, such as CuAg, CuNi, NiAg, CoCu, NiAl, RuAl, RhAl, and AgSn, can also be used for the interlayer 308. The interlayer 308 can also be a polycrystalline nonmagnetic Heusler alloy or half Heusler alloy, or other B2 or bcc materials, such as AlX, where X=V, Mn, Fe, Co, Ni, Ru, Rh, and Nobel metals Re, Os, Ir, Pt, Au, and Pd or in alloy combinations thereof; CrMo, where Mo is between about 20% to about 50%, CrMoTi, Cr, MoV, CrMoW; or CrXY, where X and Y are each individually selected from the group consisting of: Al, Ti, Mn, Co, Ni, Ru, Mo, Rh, W, and V; or in any combination of these material layers which has a higher resistive non-interacting layer next to the FM layer 312, among others.

When alloyed with nonmagnetic materials that do not readily intermix with FM layer 312, examples of high resistive amorphous interlayers 308 materials include Ge/CoFe/CuAg (as used here "I" denotes separate sublayers in a stack or layer) (where Ge/CoFe may form a single layer at room temperature or may be deposited as an alloy layer, and where Ge has a thickness of about 6 Å, CoFe has a thickness of about 4 Å, and CuAg has a thickness of about 3 Å), CuAg/Ge/CoFe/CuAg (where CuAg/Ge/CoFe may form a single layer at room temperature or may be deposited as an alloy layer, and where CuGe has a thickness of about 3 Å, Ge has a thickness of about 5 Å, CoFe has a thickness of about 4 Å, and CuAg has a thickness of about 2 Å), or thin nonmagnetic alloy layers like CoFeGe, NiFeGe, CoFeGeAg, etc. (alloy composition for alloys with Ge should be greater than about 44 at. % Ge to render the alloy nonmagnetic). When alloyed with nonmagnetic materials that do not readily intermix with FM layer 312, additional examples of elements, compounds, or crystalline/amorphous/nanocrystalline materials that may be utilized as the interlayer 308 include: Ge/CoFe/NiFeTaN (where Ge/CoFe may form a single layer at room temperature or may be deposited as an alloy layer, and where Ge has a thickness of about 6 Å, CoFe has a thickness of about 4 Å, and NiFeTaN has a thickness of about 3 Å); Ge/CoFe/MgO (where Ge/CoFe may form a single layer at room temperature or may be deposited as an alloy layer, and where Ge has a thickness of about 6 Å, CoFe has a thickness of about 4 Å, and MgO has a thickness of about 3 Å); and MgO/Ge/CoFe (where Ge/CoFe may form a single layer at room temperature or may be deposited as an alloy layer, and where MgO has a thickness of about 3 Å, Ge has a thickness of about 6 Å, and CoFe has a thickness of about 4 Å). Examples of an interlayer 308 using alloys with $X_2YZ$ Heusler alloys would be Ge/Co$_2$FeGe (which may form a single layer at room temperature or may be deposited as an alloy layer, and where Ge is about 4 Å thick and Co$_2$FeGe is about 5 Å thick); or using alloys with XYZ half Heusler alloys like Ge/CoFeGe (which may form a single layer at room temperature or may be deposited as an alloy layer, where Ge is about 3 Å thick and CoFeGe is about 6 Å thick); and Ge/CoA (which may form a single layer at room temperature or may be deposited as an alloy layer), Ge/FeA (which may form a single layer at room temperature or may be deposited as an alloy layer), or Ge/NiA (which may form a single layer at room temperature or may be deposited as an alloy layer), where A can be one or more elements belonging to full Heusler alloys $X_2YZ$ or half Heusler alloys XYZ; or used in combination with very thin (i.e., dusting layers about 1 Å to about 5 Å thick) of nonmagnetic seed or capping layers of alloys of CuAg, NiCr, CoCu, AgSn, etc., such as Ge/$X_2$YZ/CuAg, Ge/$X_2$YZ/CuNi, CuN i/Ge/$X_2$YZ, or CuAg/Ge/$X_2$YZ/Cu Ni. The alloy composition should be nonmagnetic as in the case of alloys with one of the aforementioned non-interacting elements or alloys of these elements like Ge where Ge exceeds about 44 at. % to render the alloy nonmagnetic.

Additionally, the interlayer 308 may comprise nonmagnetic alloy or multilayer stack containing one or more of the following elements Cu, Ag, Ge, Mn, Ni, Co, Mo, W, In, B, Te, Se, Y, Pt, Ti, N, and Sn; or in conjunction with magnetic alloys such as CoA, FeA, and NiA, where A can be one or more elements belonging to full Heusler alloys $X_2YZ$ or half Heusler alloys XYZ, where X is selected from the group consisting of: Mn, Fe, Co, Ni, Cu, Ru, Rh, Pd, Ag, Ir, Pt, and Au; where Y is selected from the group consisting of: Ti, V, Cr, Mn, Fe, Co, Ni, Zn, Y, Zr, Nb, Mo, Hf and W; and where Z is selected from the group consisting of: B, Al, S1, Ga, Ge, As, In, Sn, Sb, and Bi. The magnetic alloys or Heusler alloys should combine with other layers, combinations of elements, or other alloys to form a nonmagnetic layer or multilayer stack after room temperature deposition and intermixing, or deposited as a nonmagnetic single layer alloy, or in combinations thereof. The overall total thickness of the interlayer 308 is less than about 20 Å, such as about 3 Å to about 15 Å to ensure adequate magnetic coupling of the FM layer 312 to the BiSb layer 310. Nonmagnetic polycrystalline Heusler alloys may also be used for the interlayer 308, such as $V_2$VAl or $[Mn_{0.5}Co_{0.5}]_2$VAl, etc.

The interlayer 308 should have higher resistivity and be nonmagnetic. Thin, high resistivity, low Z ceramic oxide and nitride layers of TiN, SiN, $Al_2O_3$, MgO, thin layers can be used in the interlayer 308. Furthermore, other materials that may be used as the interlayer 308 if not disposed in direct contact with the BiSb layer 310 include: high resistivity, heavier metal amorphous/nanocrystalline metals such as NiFeTa, NiTa, NiVVTa, NiFeW, NiW, and WRe; nanocrystalline metals like beta-Ta or beta-W; or nitrides, oxides, or borides of the aforementioned elements or alloys such as NiTaN, NiFeTaN, NiVVTaN, NiWN, WReN, TaN, WN, TaOx, WOx, TaBx, WBx, and HfBx. Higher resistivity, nonmagnetic alloys which don't readily interact with the BiSb layer 310 or the FM layer 312 may also be used for the interlayer 308, such as Cu, Ag, Ge, Mn, Ni, Co Mo, W, Sn, B, In, and multi-element alloys combinations thereof, like CuAg, CuNi, NiAg, CoCu, NiAl, RuAl, RhAl, CuCo, and AgSn.

Examples of high resistive, amorphous materials for the interlayer 308 include Ge (6 Å)/CoFe (4 Å)/CuAg (3 Å) (which may form a single layer at room temperature or may be deposited as an alloy layer), CuAg (3 Å)/Ge (5 Å)/CoFe (3 Å)/CuAg (2 Å) (which may form a single layer at room temperature or may be deposited as an alloy layer), or single alloy nonmagnetic layers of CoFeGe, NiFeGe, CoFeGeAg, among others. The interlayer 308 may comprise thin multilayer stacks consisting of the aforementioned elements, compounds, or crystalline/amorphous/nanocrystalline layers as long as the overall multilayer stack is nonmagnetic and has a high resistivity.

Magnetic alloys and magnetic Heusler alloys can be used for the interlayer 308 if used in combinations with other elements or alloys above such that when deposited, the materials intermix at room temperature, or after post annealing, to form a nonmagnetic stack. Examples include layers of NiFeX, CoFeX, NiX, FeX, CoX, where X is an element that does not readily interact with BiSb, such as Cu, Ag, Ge, Mn, Ni, Co, Mo, W, Sn, B, Te, Se, Y, Pt, Ti, N, and In, or magnetic Heusler alloys deposited on non-interacting element or alloy layers like Ge layers and in single alloy deposition layers where the resulting Ge content in the intermixed alloy renders it nonmagnetic (e.g., in the case of alloying with Ge the Ge content should be greater than or equal to about 44 at. %); or in combination with sufficiently thick layers of elements which do not readily interact with BiSb, such as Cu, Ag, Ge, Mn, Ni, Co, Mo, W, Sn, B, and In, to form multi-element, nonmagnetic, high resistivity combinations thereof; or single polycrystalline nonmagnetic Heusler layers.

Another example of materials that may be used for the interlayer 308 and/or the buffer layer 306 include: Ge/CoFe/NiFeTaN (where Ge/CoFe may form a single layer at room temperature or may be deposited as an alloy layer, and where Ge has a thickness of about 6 Å, CoFe has a thickness of about 4 Å, and NiFeTaN has a thickness of about 3 Å).

The buffer layer 306 may further comprise any of the above-listed materials used in the interlayer 308, such as a single alloy layer or layer combinations; nonmagnetic alloys or multilayer stacks comprising one or more of the following elements Cu, Ag, Ge, Mn, Ni, Mo, and W; or multi-element alloy combinations thereof; or in conjunction with magnetic and or nonmagnetic alloys such as CoA, FeA, NiA, where A is one or more elements belonging to full Heusler alloys $X_2YZ$ or half Heusler alloys XYZ, where X is selected from the group consisting of: Mn, Fe, Co, Ni, Cu, Ru, Rh, Pd, Ag, Ir, Pt, and Au; Y is selected from the group consisting of: Ti, V, Cr, Mn, Fe, Co, Ni, Zn, Y, Zr, Nb, Mo, Hf, and W; and Z is selected from the group consisting of: B, Al, Si, Ga, Ge, As, In, Sn, Sb, and Bi. The magnetic alloy or Heusler alloys should combine with other elements such as Cu, Ag, Ge, Mn, Co, Ni, Mo, Sn, In, B, Te, Se, Y, Pt, Ti, N, and W, or combine in multi-elemental alloy layers thereof, to form a nonmagnetic total stack buffer layer 306. The buffer layer 306 may be thin or relatively thick, such as having a thickness in the y-direction of about 5 Å to about 100 Å. A thicker buffer layer 306 can provide better migration resistance against elements from neighboring stacks getting into the BiSb layer 310, or provide better migration resistance of the Bi or the Sb migration out of the BiSb layer 310. The buffer layer 306 can be made thicker by lamination of layers to better control SOT nucleation/growth and texture.

Additional examples of materials that can be used for the buffer layer 306 include: [Ge/$X_2YZ$]*n laminations, [Ge/XYZ]*n laminations, and [Ge/XYZ]*n laminations, where n is a whole numeral; Ge-enriched $X_2YZ$ and Ge-enriched XYZ single layer alloys such that the buffer layer 306 is nonmagnetic (i.e., Ge>44%); [Ge (6 Å)/Co$_2$(MnFe)Ge (4 Å)]*4, [Ge (3 Å)/CoFeGe (6 Å)]*3, and [Ge (6 Å)/NiFe (4 Å)]*n; and with Ge alloyed or layered with NiA, FeA, CoA in lamination, where A is one or more elements belonging to full Heusler alloys $X_2YZ$ or half Heusler alloys XYZ, for example, [Ge (6 Å)/NiA (4 Å)]*n] where 1<n<4. The overall buffer layer 306 has a thickness between about 10 Å to about 50 Å.

As shown in FIGS. 3B and 3C, soft bias (SB) side shields 326 are disposed on either side of the free layer 314 at the MFS. The SB side shields 326 comprise a magnetic material, such as NiFe, CoFe, NiFeCo, CoFeHf, CoFeCr, or combinations thereof. The SB side shields 326 may be spaced from the free layer 314 and/or the insulation layer 304 by one or more insulation layers 303. The insulation layers 303 may be part of the insulation layer 304. For clarity, only the free layer 314 and the BiSb layer 310 are shown in FIG. 3B and only the free layer 314 is shown in FIG. 3C. However, the cap layer 316 and/or additional layers may be exposed at the MFS as well, as discussed above.

During operation, current (at the I+ lead) is applied or injected into the second shield 318, such as by the current source 270 of FIG. 2. The current, which is spin-polarized when it comes out of the interlayer 308, then flows down through the second shield 318 in the −y-direction through the cap layer 316, the free layer 314, the FM layer 312, and the interlayer 308. The current then flows perpendicular in the z-direction through the BiSb layer 310, away from the MFS, to the back of the BiSb layer 310 as the current (at the I− lead) return path (shown by arrow 350 in FIG. 3A). While flowing within the BiSb layer 310, there will be transverse voltage induced by the spin current, due to an inverse spin Hall effect, which can be sensed or detected at the cross-track locations marked V+ and V−, shown in FIG. 3B. The S1 notch 320 and the insulation layer 304 disposed between the buffer layer 306 and the first shield 302 each help to confine the current path to be an L-like shape. Because the BiSb layer 310 is recessed from the MFS and the free layer 314 is exposed at the MFS, the field sensing of the voltage is improved.

Figure 4A:
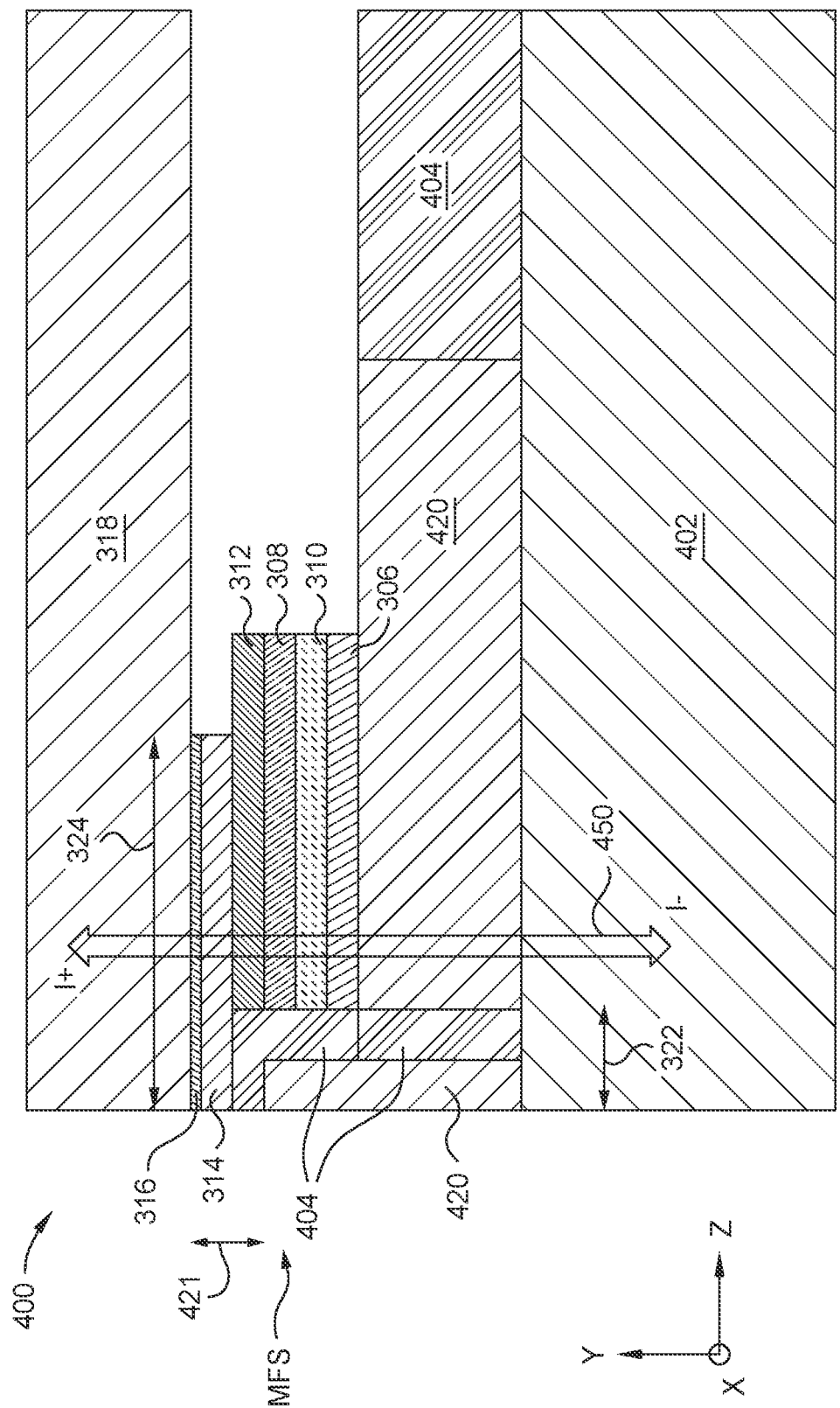
FIGS. 4A-4C illustrate various views of a SOT device, according to another embodiment.
Figure 4C:
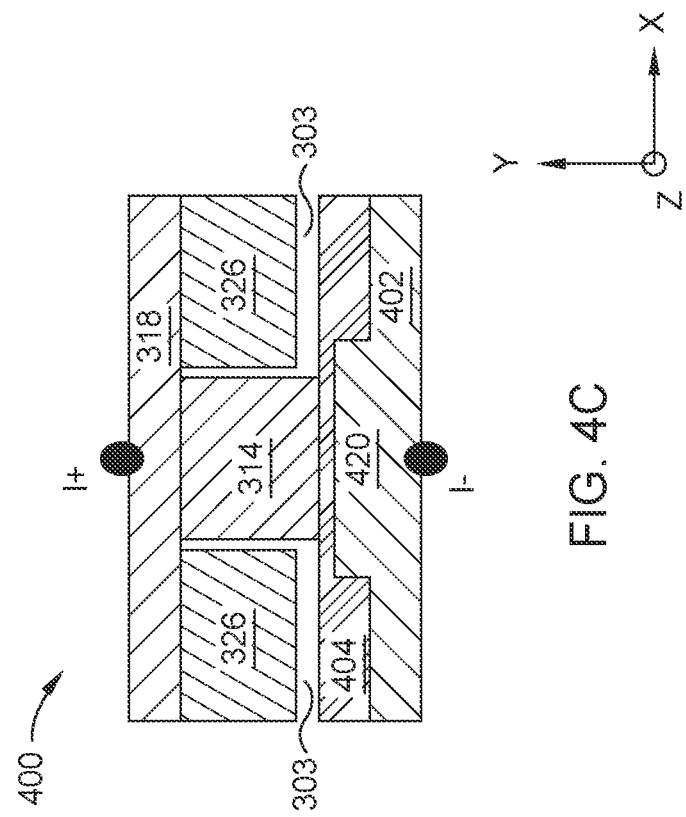
Figure 4B:
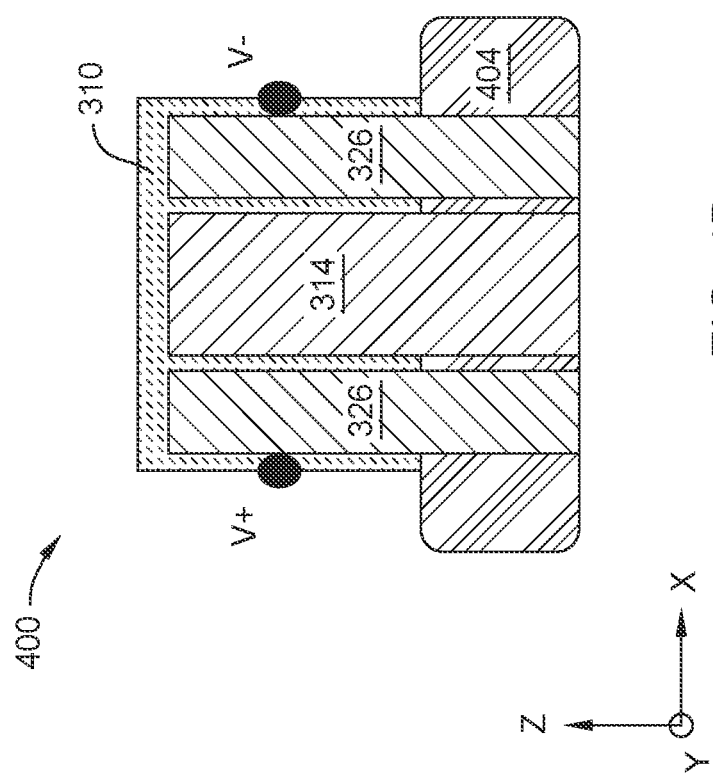

FIGS. 4A-4C illustrate various views of a SOT device 400, according to another embodiment. FIG. 4A illustrates a cross-sectional or APEX view of the SOT device 400, FIG. 4B illustrates a downtrack cross-sectional view of the SOT device 400, and FIG. 4C illustrates a MFS view of the SOT device 400. The downtrack cross-sectional view of FIG. 4B illustrates the top of the free layer 314, but does not show the second shield 318.

The SOT device 400 comprises a first shield (S1) 402, a S1 notch 420 disposed on the first shield 402, an insulation layer 404 disposed on the first shield 402 excluding where the S1 notch is disposed, the buffer layer 306 disposed on the recessed portion of the S1 notch 420, the BiSb layer 310 disposed on the buffer layer 306, the interlayer 308 disposed on the BiSb layer 310, the FM layer 312 disposed on the interlayer 308, the free layer 314 disposed on the FM layer 312, the cap layer 316 disposed on the free layer 314, and the second shield (S2) 318 disposed on the cap layer 316.

The S1 notch 420 disposed at the MFS. The insulation layer 404 is disposed on the S1 notch 420 at the MFS, and is further disposed between the S1 notch 420 and a portion of the S1 notch 420 recessed from the MFS. A portion of the insulation layer 404 may be disposed behind the recessed portion of the S1 notch 420. The S1 notch 420 has a thickness in the y-direction of about 20 nm to about 100 nm. The first shield 402 and S1 notch 420 each individually comprises a magnetic permeable and electrically conductive material selected from the group consisting of NiFe, CoFe, NiFeCo, or any material listed above for the first shield 302 of FIGS. 3A-3C. The S1 notch 420 having a disposed at the MFS and a portion recessed from the MFS helps to confine the vertical current path, as discussed further below.

The SOT device 400 may comprise additional layers not shown, such as a seed layer and/or a barrier layer. The materials of each of the buffer layer 306, the BiSb layer 310, the interlayer 308, the FM layer 312, the free layer 314, and the cap layer 316 are described above. The insulation layer 404 comprises an insulating material like SiN, AlOx, where x is a numeral, or an oxide like MgO and can be used in combination with a Heusler alloy layer, and is adjacent to the BiSb layer to maintain texture and control Bi and Sb interdiffusion Similar to the SOT device 300 of FIGS. 3A-3C, in the SOT device 400, the buffer layer 306, the BiSb layer 310, the interlayer 308, and the FM layer 312 are recessed from the MFS by a portion of the insulation layer 404. The free layer 314 and the cap layer 316 are disposed at the MFS. The buffer layer 306, the BiSb layer 310, the interlayer 308, and the FM layer 312 are recessed from the MFS a distance 322 in the z-direction of about 5 nm to about 20 nm. The free layer 314 and the cap layer 316 each individually has a stripe height 324 in the z-direction of about 10 nm to about 30 nm. The distance 322 the buffer layer 306, the BiSb layer 310, the interlayer 308, and the FM layer 312 are recessed from the MFS is less than the stripe height 324. The buffer layer 306, the BiSb layer 310, the interlayer 308, and the FM layer 312 may also have a stripe height in the z-direction of about 10 nm to about 50 nm.

Comparing the SOT device 400 to the SOT device 300, in the SOT device 400, the buffer layer 306, the BiSb layer 310, the interlayer 308, and the FM layer 312 are recessed from the MFS by a portion of the insulation layer 404, rather than by the S1 notch 320 and the insulation layer 304 like in the SOT device 300. Additionally, the buffer layer 306 of the SOT device 400 is disposed on the S1 notch 420, rather than on the insulation layer 304 like in the SOT device 300.

Furthermore, due to the S1 notch 420, the shield-to-shield spacing of the SOT device 400 is reduced, which narrows the read gap. The shield-to-shield spacing is the distance 421 from the second shield 318 to the S1 notch 420 at the MFS, which includes the free layer 314, the cap layer 316, and the portion of the insulation layer 404 disposed at the MFS. The distance 421 is about 5 nm to about 20 nm.

As shown in FIGS. 4B and 4C, the SB side shields 326 are disposed on either side of the free layer 314 at the MFS. The SB side shields 326 may be spaced from the free layer 314 and/or the insulation layer 404 by one or more insulation layers 303. The insulation layers 303 may be part of the insulation layer 404. For clarity, only the free layer 314 and the BiSb layer are shown in FIG. 4B and only the free layer 314 is shown in FIG. 4C. However, the cap layer 316 and/or additional layers may be exposed at the MFS as well, as discussed above.

During operation, current (at the I+ lead) is applied or injected into the second shield 318, such as by the current source 270 of FIG. 2. The current then flows down through the second shield 318 in the −y-direction through the cap layer 316, the free layer 314, the FM layer 312, the interlayer 308, the BiSb layer 310, the buffer layer 306, the S1 notch 420, and the first shield 402 as the current (at the I− lead) return path, as shown by arrow 450 in FIG. 4A. The current, which is spin-polarized when it comes out of the interlayer 308, will induce a transverse voltage inside the BiSb layer 310 along cross-track direction, due to the inverse spin Hall effect. This induced voltage, which varies dependent on the free layer 314's orientation responsive to sensed magnetic field from the media, is sensed or detected at the locations marked V+ and V−, shown in FIG. 4B. The S1 notch 420 having a disposed at the MFS and a portion recessed from the MFS helps to confine the vertical current path. Because the BiSb layer 310 is recessed from the MFS and the free layer 314 is exposed at the MFS, the field sensing of the voltage is improved.

FIGS. 5A-5C illustrate various views of a SOT device 500, according to yet another embodiment. FIG. 5A illustrates a cross-sectional or APEX view of the SOT device 500, FIG. 5B illustrates a downtrack cross-sectional view of the SOT device 500, and FIG. 5C illustrates a MFS view of the SOT device 500. The downtrack cross-sectional view of FIG. 5B illustrates the top of the free layer 314, but does not show the second shield 518 or the S2 notch 528.

The SOT device 500 comprises the first shield (S1) 402, the S1 notch 420 disposed on the first shield 402, the insulation layer 404 disposed adjacent to the S1 notch 420, the buffer layer 306 disposed on the S1 notch 402, the BiSb layer 310 disposed on the buffer layer 306, the interlayer 308 disposed on the BiSb layer 310, the FM layer 312 disposed on the interlayer 308, the free layer 314 disposed on the FM layer 312, the cap layer 316 disposed on the free layer 314, and a second shield (S2) 518 disposed on the cap layer 316. The insulation layer 404 is disposed on the S1 notch 420 at the MFS, and is further disposed between the S1 notch 420 and a portion of the S1 notch 420 recessed from the MFS. A portion of the insulation layer 404 may be disposed behind the recessed portion of the S1 notch 420. The second shield 518 further comprises a S2 notch 528. The S2 notch 528 is disposed between and in contact with the second shield 518 and the cap layer 316 at the MFS. The S2 notch 528 may have a thickness in the y-direction of about 3 nm to about 20 nm. The second shield 518 and the S2 notch 528 each individually comprises a magnetic permeable and electrically conductive material selected from the group consisting of NiFe, CoFe, NiFeCo, NiFe, CoFe, NiFeCr, or other soft magnetic shielding materials.

The SOT device 500 may comprise additional layers not shown, such as a seed layer and/or a barrier layer. The materials of each of the buffer layer 306, the BiSb layer 310, the interlayer 308, the FM layer 312, the free layer 314, the cap layer 316, and the insulation layer 404 are described above.

Similar to the SOT device 400 of FIGS. 4A-4C, in the SOT device 500, the buffer layer 306, the BiSb layer 310, the interlayer 308, and the FM layer 312 are recessed from the MFS by a portion of the insulation layer 404. The free layer 314 and the cap layer 316 are disposed at the MFS. The buffer layer 306, the BiSb layer 310, the interlayer 308, and the FM layer 312 are recessed from the MFS a distance 322 in the z-direction of about 5 nm to about 20 nm. The free layer 314 and the cap layer 316 each individually has a stripe height 324 in the z-direction of about 10 nm to about 20 nm. The distance 322 the buffer layer 306, the BiSb layer 310, the interlayer 308, and the FM layer 312 are recessed from the MFS is less than the stripe height 324. The buffer layer 306, the BiSb layer 310, the interlayer 308, and the FM layer 312 may also have a stripe height in the z-direction of about 10 nm to about 20 nm.

Furthermore, due to the S1 notch 420 and the S2 notch 528, the shield-to-shield spacing of the SOT device 500 is reduced, which narrows the read gap. The shield-to-shield spacing is the distance 521 from the S2 notch 528 to the S1 notch 420 at the MFS, which includes the free layer 314, the cap layer 316, and the portion of the insulation layer 404 disposed at the MFS. The distance 521 is about 5 nm to about 20 nm.

As shown in FIGS. 5B and 5C, the SB side shields 326 are disposed on either side of the free layer 314 at the MFS. The SB side shields 326 may be spaced from the free layer 314 and/or the insulation layer 404 by one or more insulation layers 303. The insulation layers 303 may be part of the insulation layer 404. A width of the S1 notch 420 at the MFS in the x-direction may be equal to or greater than a width of the free layer 314. For clarity, only the free layer 314 and the BiSb layer 310 are shown in FIG. 5B and only the free layer 314 is shown in FIG. 5C. However, the cap layer 316 and/or additional layers may be exposed at the MFS as well, as discussed above.

The SOT device 500 further comprises an anti-ferromagnetic (AFM) layer 534 disposed on the SB side shields 326 and adjacent to the S2 notch 528. An insulation layer 532 is disposed on the AFM layer 534 and adjacent to the S2 notch 528. The AFM layer 534 pins the SB side shields 326. The AFM layer 534 may comprise a single or multiple layers of PtMn, NiMn, IrMn, IrMnCr, CrMnPt, FeMn, other antiferromagnetic materials, or combinations thereof.

During operation, current (at the I+ lead) is applied or injected into the second shield 518, such as by the current source 270 of FIG. 2. The current then flows down through the second shield 518 in the −y-direction through the S2 notch 528, the cap layer 316, the free layer 314, the FM layer 312, the interlayer 308, the BiSb layer 310, the buffer layer 306, the S1 notch 420, and the first shield 402 as the current (at the I− lead) return path, as shown by arrow 550 in FIG. 5A. The current, which is spin-polarized when it comes out of the interlayer 308, will induce a transverse voltage inside the BiSb layer 310 along cross-track direction, due to the inverse spin Hall effect. This induced voltage, which varies dependent on the free layer 314's orientation responsive to sensed magnetic field from the media, is sensed or detected at the locations marked V+ and V−, shown in FIG. 5B. The S1 notch 420 and the S2 notch 528 each help to confine the vertical current path. Because the BiSb layer 310 is recessed from the MFS and the free layer 314 is exposed at the MFS, the field sensing of the voltage is improved.

Comparing the SOT device 500 to the SOT device 400, in the SOT device 500 comprises the S2 notch 528, whereas the second shield 318 of the SOT device 400 does not. Additionally, the SOT device 500 further comprises the AFM layer 534 and the insulation layer 532, whereas the SOT device 400 does not.

Figure 6A:
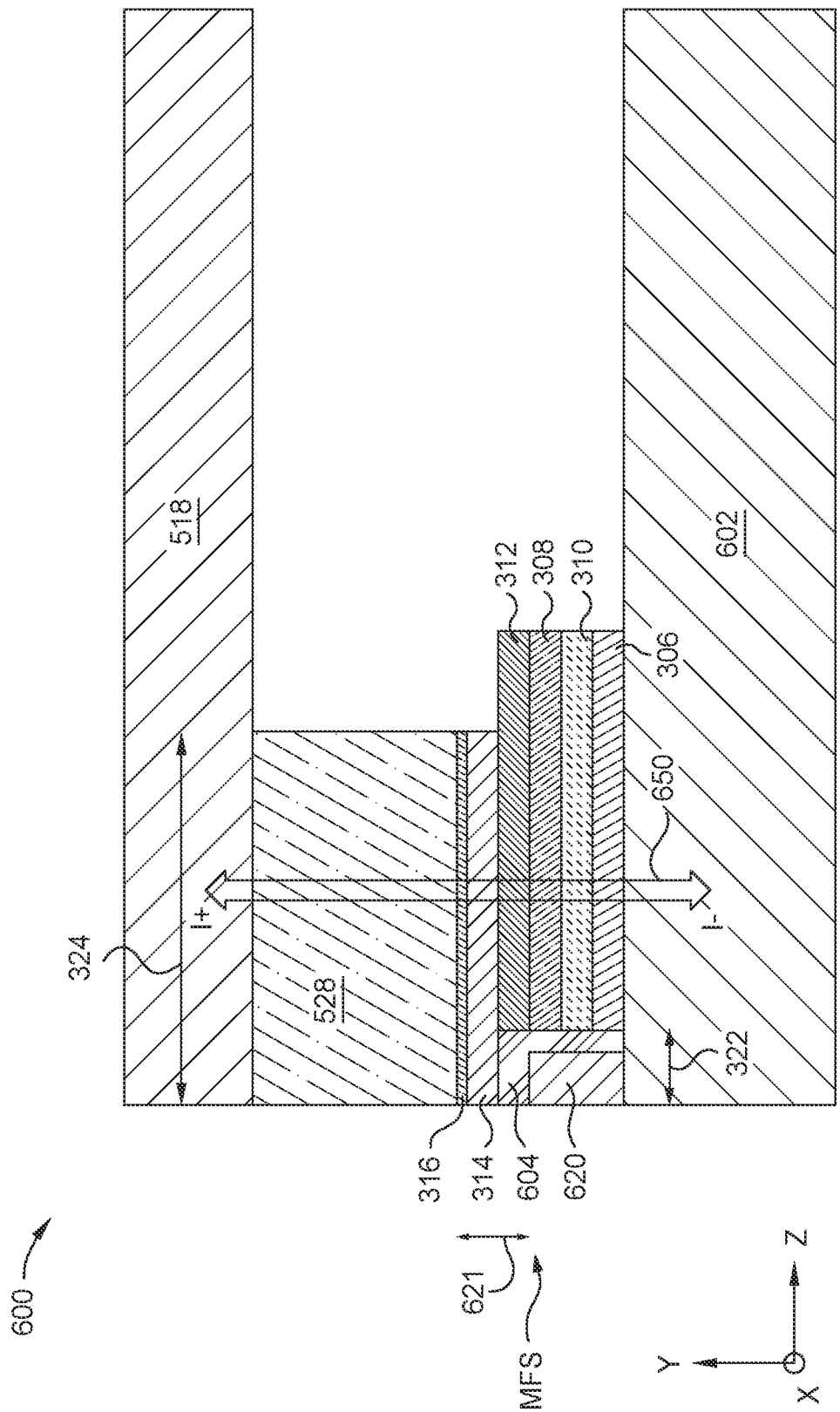

FIGS. 6A-6C illustrate various views of a SOT device 600, according to another embodiment. FIG. 6A illustrates a cross-sectional or APEX view of the SOT device 600, FIG. 6B illustrates a downtrack cross-sectional view of the SOT device 600, and FIG. 6C illustrates a MFS view of the SOT device 600. The downtrack cross-sectional view of FIG. 6B illustrates the top of the free layer 314, but does not show the second shield 518 or the S2 notch 528.

The SOT device 600 comprises a first shield (S1) 602, the S1 notch 620 disposed on the first shield 602, the insulation layer 604 disposed on the S1 notch 620, the buffer layer 306 disposed on the first shield 602, the BiSb layer 310 disposed on the buffer layer 306, the interlayer 308 disposed on the BiSb layer 310, the FM layer 312 disposed on the interlayer 308, the free layer 314 disposed on the FM layer 312, the cap layer 316 disposed on the free layer 314, and the second shield (S2) 518 disposed on the cap layer 316. The insulation layer 604 is disposed on the S1 notch 620 at the MFS, and is further disposed behind the S1 notch 620 recessed from the MFS (e.g., between the S1 notch 620 and the buffer layer 306, the BiSb layer 310, the interlayer 308, and the FM layer 312). The second shield 518 further comprises the S2 notch 528. The S2 notch 528 is disposed between and in contact with the second shield 518 and the cap layer 316 at the MFS. The S1 notch 620 and the first shield 602 each individually comprises a magnetic permeable and electrically conductive material selected from the group consisting of NiFe, CoFe, NiFeCo, or any material listed above for the first shield 302 in FIGS. 3A-3C. The S1 notch 620 has a thickness in the y-direction of about 1 nm to about 5 nm.

The SOT device 600 may comprise additional layers not shown, such as a seed layer and/or a barrier layer. The materials of each of the buffer layer 306, the BiSb layer 310, the interlayer 308, the FM layer 312, the free layer 314, and the cap layer 316. The insulation layer 604 comprises an insulating material like SiN, AlOx, where x is a numeral, or an oxide like MgO and can be used in combination with a Heusler alloy layer, and is adjacent to the BiSb layer to maintain texture and control Bi and Sb interdiffusion Similar to the SOT device 500 of FIGS. 5A-5C, in the SOT device 600, the buffer layer 306, the BiSb layer 310, the interlayer 308, and the FM layer 312 are recessed from the MFS by a portion of the insulation layer 604. The free layer 314 and the cap layer 316 are disposed at the MFS. The buffer layer 306, the BiSb layer 310, the interlayer 308, and the FM layer 312 are recessed from the MFS a distance 322 in the z-direction of about 5 nm to about 20 nm. The free layer 314 and the cap layer 316 each individually has a stripe height 324 in the z-direction of about 10 nm to about 20 nm. The distance 322 the buffer layer 306, the BiSb layer 310, the interlayer 308, and the FM layer 312 are recessed from the MFS is less than the stripe height 324. The buffer layer 306, the BiSb layer 310, the interlayer 308, and the FM layer 312 may also have a stripe height in the z-direction of about 10 nm to about 20 nm.

Furthermore, due to the S1 notch 620 and the S2 notch 528, the shield-to-shield spacing of the SOT device 600 is reduced, which narrows the read gap. The shield-to-shield spacing is the distance 621 from the S2 notch 528 to the S1 notch 620 at the MFS, which includes the free layer 314, the cap layer 316, and the portion of the insulation layer 604 disposed at the MFS. The distance 621 is about 5 nm to about 20 nm.

As shown in FIGS. 6B and 6C, the SB side shields 326 are disposed on either side of the free layer 314 at the MFS, and may be spaced from the free layer 314 by an insulation layer (not shown). The SB side shields 326 are disposed in contact with the first shield 602 and the insulation layer 604. Since the insulation layer 604 surrounds the S1 notch 620 at the MFS, the SB side shields 326 are spaced from the S1 notch 620. The SOT device 600 further comprises the insulation layer 532 disposed on the SB side shields 326 and adjacent to the S2 notch 528. For clarity, only the free layer 314 and the BiSb layer 310 are shown in FIG. 6B and only the free layer 314 is shown in FIG. 6C. However, the cap layer 316 and/or additional layers may be exposed at the MFS as well, as discussed above.

During operation, current (at the I+ lead) is applied or injected into the second shield 518, such as by the current source 270 of FIG. 2. The current then flows down through the second shield 518 in the −y-direction through the S2 notch 528, the cap layer 316, the free layer 314, the FM layer 312, the interlayer 308, the BiSb layer 310, the buffer layer 306, and the first shield 602 as the current (at the I− lead) return path, as shown by arrow 650 in FIG. 6A. The current, which is spin-polarized when it comes out of the interlayer 308, will induce a transverse voltage inside the BiSb layer 310 along cross-track direction, due to the inverse spin Hall effect. This induced voltage, which varies dependent on the free layer 314's orientation responsive to sensed magnetic field from the media, is sensed or detected at the locations marked V+ and V−, shown in FIG. 6B. The S1 notch 620 and the S2 notch 528 each helps to confine the vertical current path. Because the BiSb layer 310 is recessed from the MFS and the free layer 314 is exposed at the MFS, the field sensing of the voltage is improved.

Comparing the SOT device 600 to the SOT device 500, in the SOT device 600, the buffer layer 306 is disposed in contact with the first shield 602, whereas the buffer layer 306 of the SOT device 500 is disposed in contact with the S1 notch 420. Additionally, the SOT device 600 does not comprise the AFM layer 534 on the insulation layer 532.

Figure 7A:
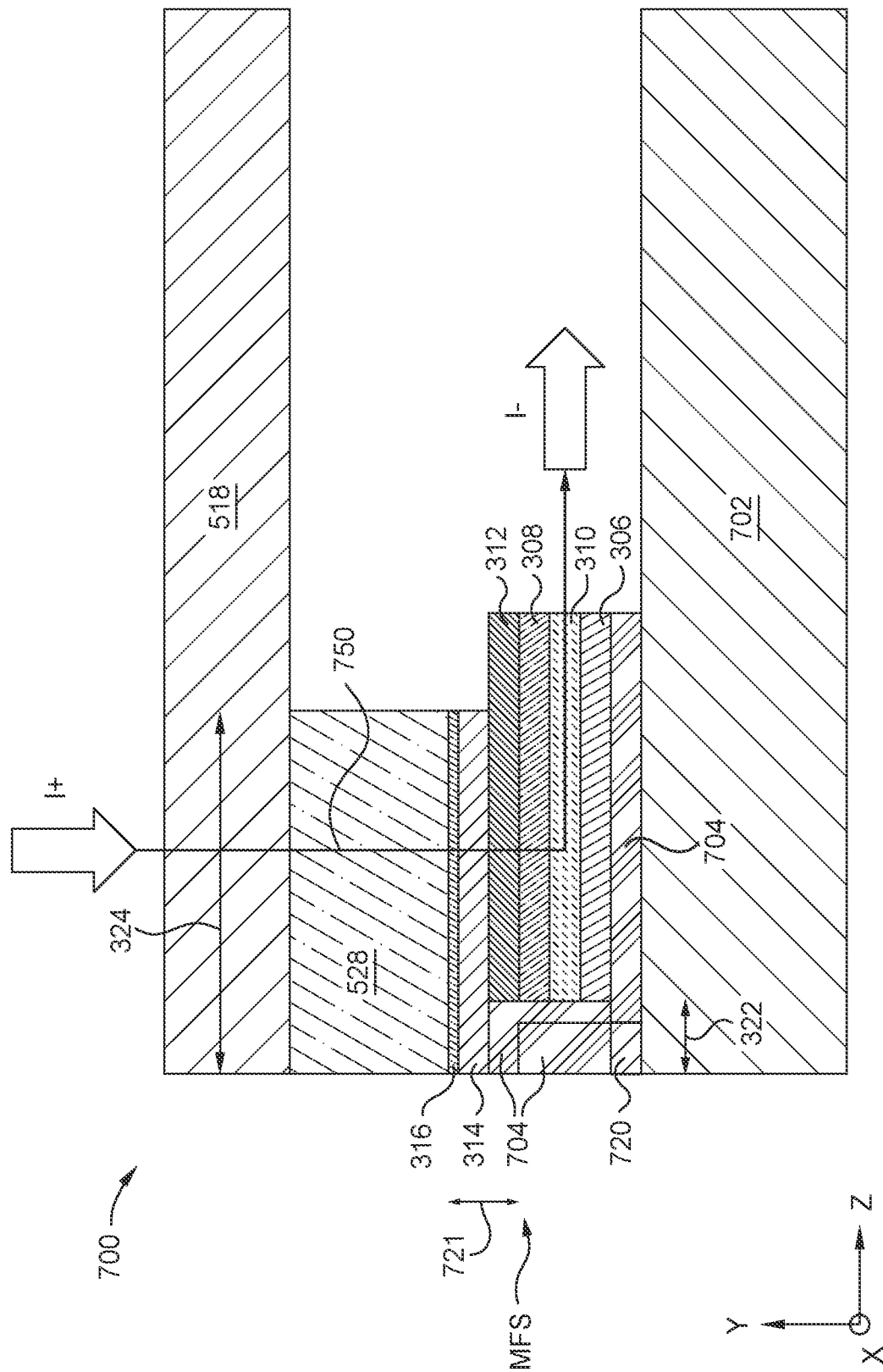

FIGS. 7A-7C illustrate various views of a SOT device 700, according to yet another embodiment. FIG. 7A illustrates a cross-sectional or APEX view of the SOT device 700, FIG. 7B illustrates a downtrack cross-sectional view of the SOT device 700, and FIG. 7C illustrates a MFS view of the SOT device 700. The downtrack cross-sectional view of FIG. 7B illustrates the top of the free layer 314, but does not show the second shield 518 or the S2 notch 528.

The SOT device 700 comprises a first shield (S1) 702, a S1 notch 720 disposed on the first shield 702, the insulation layer 704 disposed on the S1 notch 720 and on the first shield 702, the buffer layer 306 disposed on the insulation layer 704, the BiSb layer 310 disposed on the buffer layer 306, the interlayer 308 disposed on the BiSb layer 310, the FM layer 312 disposed on the interlayer 308, the free layer 314 disposed on the FM layer 312, the cap layer 316 disposed on the free layer 314, the S2 notch 528 disposed on the cap layer 316, and the second shield (S2) 518 disposed on the S2 notch 528. The insulation layer 704 is disposed on the S1 notch 720 at the MFS, and is further disposed behind the S1 notch 720 recessed from the MFS and between the first shield 702 and the buffer layer 306 such that the insulation layer 704 has a Z-like shape. The second shield 518 further comprises the S2 notch 528. The S2 notch 528 is disposed between and in contact with the second shield 518 and the cap layer 316 at the MFS. The S1 notch 720, the first shield 702, the S2 notch 528, and the second shield 518 each individually comprises a magnetic permeable and electrically conductive material selected from the group consisting of NiFe, CoFe, NiFeCo, or any material listed above for the first shield 302 in FIGS. 3A-3C. The S1 notch 720 has a thickness in the y-direction of about 1 nm to about 5 nm.

The SOT device 700 may comprise additional layers not shown, such as a seed layer and/or a barrier layer. The materials of each of the buffer layer 306, the BiSb layer 310, the interlayer 308, the FM layer 312, the free layer 314, and the cap layer 316 are described above. The insulation layer 704 comprises an insulating material like SiN, AlOx, where x is a numeral, or an oxide like MgO and can be used in combination with a Heusler alloy layer, and is adjacent to the BiSb layer to maintain texture and control Bi and Sb interdiffusion Similar to the SOT device 300 of FIGS. 3A-3C, in the SOT device 700, the buffer layer 306, the BiSb layer 310, the interlayer 308, and the FM layer 312 are recessed from the MFS by a portion of the insulation layer 704. The free layer 314 and the cap layer 316 are disposed at the MFS. The buffer layer 306, the BiSb layer 310, the interlayer 308, and the FM layer 312 are recessed from the MFS a distance 322 in the z-direction of about 5 nm to about 20 nm. The free layer 314 and the cap layer 316 each individually has a stripe height 324 in the z-direction of about 10 nm to about 20 nm. The distance 322 the buffer layer 306, the BiSb layer 310, the interlayer 308, and the FM layer 312 are recessed from the MFS is less than the stripe height 324. The buffer layer 306, the BiSb layer 310, the interlayer 308, and the FM layer 312 may also have a stripe height in the z-direction of about 10 nm to about 20 nm.

Furthermore, due to the S1 notch 720 and the S2 notch 528, the shield-to-shield spacing of the SOT device 700 is reduced, which narrows the read gap. The shield-to-shield spacing is the distance 721 from the S2 notch 528 to the S1 notch 720 at the MFS, which includes the free layer 314, the cap layer 316, and the portion of the insulation layer 704 disposed at the MFS. The distance 721 is about 5 nm to about 20 nm.

As shown in FIGS. 7B and 7C, the SB side shields 326 are disposed on either side of the free layer 314 at the MFS, and may be spaced from the free layer 314 by an insulation layer (not shown). The SB side shields 326 are disposed in contact with the first shield 702 and the insulation layer 704. Since the insulation layer 704 surrounds the S1 notch 720 at the MFS, the SB side shields 326 are spaced from the S1 notch 720. The SOT device 700 further comprises the insulation layer 532 disposed on the SB side shields 326 and adjacent to the S2 notch 528. A width of the insulation layer 532 at the MFS in the x-direction is equal to or greater than a width of the SB side shields 326. For clarity, only the free layer 314 and the BiSb layer 310 are shown in FIG. 7B and only the free layer 314 is shown in FIG. 7C. However, the cap layer 316 and/or additional layers may be exposed at the MFS as well, as discussed above.

During operation, current (at the I+ lead) is applied or injected into the second shield 518, such as by the current source 270 of FIG. 2. The current then flows down through the second shield 518 in the −y-direction through S2 notch 528, the cap layer 316, the free layer 314, the FM layer 312, and the interlayer 308. The current then flows perpendicular in the z-direction through the BiSb layer 310, away from the MFS, to the back of the BiSb layer 310 as the current (I−) return path (shown by arrow 750 in FIG. 7A). The current, which is spin-polarized when it comes out of the interlayer 308, will induce a transverse voltage inside the BiSb layer 310 along cross-track direction, due to the inverse spin Hall effect. This induced voltage, which varies dependent on the free layer 314's orientation responsive to sensed magnetic field from the media, is sensed or detected at the locations marked V+ and V−, shown in FIG. 7B. The I− lead is also shown in FIG. 7B at the top of the BiSb layer 310. The S1 notch 720, the S2 notch 528, and the insulation layer 704 disposed between the buffer layer 306 and the first shield 702 all help to confine the current path to be an L-like shape. Because the BiSb layer 310 is recessed from the MFS and the free layer 314 is exposed at the MFS, the field sensing of the voltage is improved.

Comparing the SOT device 700 to the SOT device 300, in the SOT device 700, the SOT device 700 comprises the S2 notch 528, whereas the SOT device 300 does not, and the SB side shields 326 are in direct contact with the first shield 702.

Therefore, by having a free layer of a SOT device disposed at the MFS while recessing a BiSb layer away from the MFS, the shield-to-shield spacing of the SOT device is reduced, which in turn, improves down-track resolution of the read gap of the SOT device. Furthermore, because the BiSb layer is recessed from the MFS and the free layer is exposed at the MFS, the field sensing of the current is improved during operation, improving the signal-to-noise ratio and the positioning of the SOT device.

In one embodiment, a magnetic recording head comprises a first shield extending to a media facing surface (MFS), a bismuth antimony (BiSb) layer disposed over the first shield, the BiSb layer being recessed from the MFS, a free layer disposed over the BiSb layer, the free layer extending to the MFS, and a second shield disposed over the free layer, the second shield extending to the MFS.

The magnetic recording head comprises a first notch disposed on the first shield at the MFS, wherein the BiSb layer is disposed adjacent to the first notch, and an insulation layer disposed on the first notch at the MFS, the insulation layer being in contact with the free layer. The magnetic recording head further comprises a buffer layer disposed between the first shield and the BiSb layer, the buffer layer being recessed from the MFS, an interlayer disposed over the BiSb layer, the interlayer being recessed from the MFS, and a cap layer disposed between the free layer and the second shield, the cap layer extending to the MFS. The insulation layer extends perpendicular from the MFS into the magnetic recording head, wherein the insulation layer is disposed between the buffer layer and the first shield, and wherein the insulation layer is disposed in contact with the buffer layer, the BiSb layer, and the interlayer. The magnetic recording head further comprises a second notch disposed in contact with the cap layer and the second shield, the second notch being disposed at the MFS. The BiSb layer is recessed a distance of about 5 nm to about 20 nm from the MFS. The free layer has a length extending from the MFS into the magnetic recording head greater than a distance the BiSb layer is recessed from the MFS. The magnetic recording head further comprises means for flowing a current vertically through the second shield into the free layer and horizontally out through the BiSb layer. A magnetic recording device comprising the magnetic recording head.

In another embodiment, a magnetic recording head comprises a first shield extending to a media facing surface (MFS), a first notch disposed on the first shield, the first notch having a first portion disposed at the MFS, a buffer layer disposed on the first notch, the buffer layer being recessed from the MFS, a bismuth antimony (BiSb) layer disposed on the buffer layer, the BiSb layer being recessed from the MFS, a free layer disposed over the BiSb layer, the free layer extending to the MFS, and a second shield disposed over the free layer, the second shield extending to the MFS.

The magnetic recording head further comprises an insulation layer disposed on the first notch at the MFS, the insulation layer being disposed adjacent to and in contact with the buffer layer and the BiSb layer. The buffer layer and the BiSb layer are recessed a first distance from the MFS, and a first length of the insulation layer is equal to the first distance. A second length of the free layer is greater than the first length. The magnetic recording head further comprises an interlayer disposed on the BiSb layer, and a cap layer disposed between the free layer and the second shield, the cap layer extending to the MFS. The magnetic recording head further comprises a second notch disposed between the second shield and the free layer, the second notch extending to the MFS, wherein a shield-to-shield spacing of the magnetic recording head is a second distance between the first notch and the second notch. The magnetic recording head further comprises means for flowing a current vertically through the second shield, the free layer, the BiSb layer, and the buffer layer to the first shield. The magnetic recording head further comprises a ferromagnetic (FM) layer disposed over the interlayer. A magnetic recording device comprising the magnetic recording head.

In another embodiment, a magnetic recording head comprises a first shield extending to a media facing surface (MFS), a buffer layer disposed on the first shield, a bismuth antimony (BiSb) layer disposed on the buffer layer, the BiSb layer being recessed from the MFS a first distance of about 5 nm to about 20 nm, an interlayer disposed on the BiSb layer, a free layer disposed over the interlayer, the free layer extending to the MFS, wherein the free layer has a first length extending from the MFS greater than the first distance, a cap layer disposed over the free layer, and a second shield disposed over the cap layer, the second shield extending to the MFS.

The buffer layer and the interlayer are recessed the first distance from the MFS. The magnetic recording head further comprises a first notch disposed on the first shield, the first notch being disposed at the MFS, and an insulation layer disposed on the first notch, the insulation layer being disposed in contact with the buffer layer, the BiSb layer, the interlayer, and the free layer. The magnetic recording head further comprises a second notch disposed between and in contact with the second shield and the cap layer. The magnetic recording head further comprises means for flowing a current vertically through the second shield, the cap layer, the free layer, the interlayer, the BiSb layer, and the buffer layer to the first shield. The magnetic recording head further comprises a ferromagnetic (FM) layer disposed between the interlayer and the free layer. A magnetic recording device comprising the magnetic recording head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a first shield extending to a media facing surface (MFS);
   a spin-orbit torque (SOT) layer disposed over the first shield, the SOT layer being entirely recessed from the MFS, wherein the SOT layer comprises BiSb;
   a free layer disposed over the SOT layer, the free layer extending to the MFS; and
   a second shield disposed over the free layer, the second shield extending to the MFS.

2. The magnetic recording head of claim 1, further comprising:
   a first notch disposed on the first shield at the MFS, wherein the SOT layer is disposed adjacent to the first notch; and
   an insulation layer disposed on the first notch at the MFS, the insulation layer being in contact with the free layer.

3. The magnetic recording head of claim 2, further comprising:
   a buffer layer disposed between the first shield and the SOT layer, the buffer layer being recessed from the MFS;
   an interlayer disposed over the SOT layer, the interlayer being recessed from the MFS; and
   a cap layer disposed between the free layer and the second shield, the cap layer extending to the MFS.

4. The magnetic recording head of claim 3, wherein the insulation layer extends perpendicular from the MFS into the magnetic recording head, wherein the insulation layer is disposed between the buffer layer and the first shield, and wherein the insulation layer is disposed in contact with the buffer layer, the SOT layer, and the interlayer.

5. The magnetic recording head of claim 2, further comprising a second notch disposed in contact with a cap layer and the second shield, the second notch being disposed at the MFS.

6. The magnetic recording head of claim 1, wherein the SOT layer is recessed a distance of about 5 nm to about 20 nm from the MFS.

7. The magnetic recording head of claim 1, wherein the free layer has a length extending from the MFS into the magnetic recording head greater than a distance the SOT layer is recessed from the MFS.

8. The magnetic recording head of claim 1, further comprising means for flowing a current vertically through the second shield into the free layer and horizontally out through the SOT layer.

9. A magnetic recording device comprising the magnetic recording head of claim 1.

10. A magnetic recording head, comprising:
a first shield extending to a media facing surface (MFS);
a first notch disposed on the first shield, the first notch having a first portion disposed at the MFS;
a buffer layer disposed on the first notch, the buffer layer being recessed from the MFS;
a spin-orbit torque (SOT) layer disposed on the buffer layer, the SOT layer being entirely recessed from the MFS, wherein the SOT layer comprises BiSb;
a free layer disposed over the SOT layer, the free layer extending to the MFS; and
a second shield disposed over the free layer, the second shield extending to the MFS.

11. The magnetic recording head of claim 10, further comprising an insulation layer disposed on the first notch at the MFS, the insulation layer being disposed adjacent to and in contact with the buffer layer and the SOT layer.

12. The magnetic recording head of claim 11, wherein the buffer layer and the SOT layer are recessed a first distance from the MFS, and wherein a first length of the insulation layer is equal to the first distance.

13. The magnetic recording head of claim 12, wherein a second length of the free layer is greater than the first length.

14. The magnetic recording head of claim 10, further comprising:
an interlayer disposed on the SOT layer; and
a cap layer disposed between the free layer and the second shield, the cap layer extending to the MFS.

15. The magnetic recording head of claim 10, further comprising a second notch disposed between the second shield and the free layer, the second notch extending to the MFS, wherein a shield-to-shield spacing of the magnetic recording head is a second distance between the first notch and the second notch.

16. The magnetic recording head of claim 10, further comprising means for flowing a current vertically through the second shield, the free layer, the SOT layer, and the buffer layer to the first shield.

17. The magnetic recording head of claim 10, further comprising a ferromagnetic (FM) layer.

18. A magnetic recording device comprising the magnetic recording head of claim 10.

19. A magnetic recording head, comprising:
a first shield extending to a media facing surface (MFS);
a buffer layer disposed on the first shield;
a spin-orbit torque (SOT) layer disposed on the buffer layer, the SOT layer being entirely recessed from the MFS a first distance of about 5 nm to about 20 nm, wherein the SOT layer comprises BiSb;
an interlayer disposed on the SOT layer;
a free layer disposed over the interlayer, the free layer extending to the MFS, wherein the free layer has a first length extending from the MFS greater than the first distance;
a cap layer disposed over the free layer; and
a second shield disposed over the cap layer, the second shield extending to the MFS.

20. The magnetic recording head of claim 19, wherein the buffer layer and the interlayer are recessed the first distance from the MFS.

21. The magnetic recording head of claim 19, further comprising:
a first notch disposed on the first shield, the first notch being disposed at the MFS; and
an insulation layer disposed on the first notch, the insulation layer being disposed in contact with the buffer layer, the SOT layer, the interlayer, the free layer.

22. The magnetic recording head of claim 19, further comprising a second notch disposed between and in contact with the second shield and the cap layer.

23. The magnetic recording head of claim 19, further comprising means for flowing a current vertically through the second shield, the cap layer, the free layer, the interlayer, the SOT layer, and the buffer layer to the first shield.

24. The magnetic recording head of claim 19, further comprising a ferromagnetic (FM) layer disposed between the interlayer and the free layer.

25. A magnetic recording device comprising the magnetic recording head of claim 19.

* * * * *